US010644955B2

(12) United States Patent
Zhang et al.

(10) Patent No.: US 10,644,955 B2
(45) Date of Patent: May 5, 2020

(54) METHOD AND APPARATUS FOR NETWORK SLICING

(71) Applicants: Hang Zhang, Nepean (CA); Xu Li, Nepean (CA)

(72) Inventors: Hang Zhang, Nepean (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 510 days.

(21) Appl. No.: 15/183,075

(22) Filed: Jun. 15, 2016

(65) Prior Publication Data

US 2017/0054595 A1  Feb. 23, 2017

Related U.S. Application Data

(60) Provisional application No. 62/208,118, filed on Aug. 21, 2015.

(51) Int. Cl.
*H04L 12/24* (2006.01)

(52) U.S. Cl.
CPC .......... *H04L 41/0896* (2013.01); *H04L 41/12* (2013.01); *H04L 41/5048* (2013.01)

(58) Field of Classification Search
CPC . H04L 41/0803; H04L 41/0806; H04L 41/12; H04L 41/00; H04L 41/0893; H04W 72/048; H04W 72/04; H04W 24/10; H04W 24/00

See application file for complete search history.

(56) References Cited

U.S. PATENT DOCUMENTS

| 9,077,478 | B1 * | 7/2015 | Schmidtke | H04J 14/0268 |
| 2006/0177019 | A1 * | 8/2006 | Portnykh | H04N 5/44543 379/88.13 |
| 2011/0004456 | A1 | 1/2011 | Park et al. | |
| 2011/0125905 | A1 * | 5/2011 | Baucke | H04M 15/00 709/226 |
| 2012/0155264 | A1 * | 6/2012 | Sharma | H04L 43/0852 370/232 |

(Continued)

FOREIGN PATENT DOCUMENTS

| CN | 103236945 A | 8/2013 |
| CN | 103384550 A | 11/2013 |

(Continued)

OTHER PUBLICATIONS

International Search Report for International Patent Application No. PCT/CN2016/096074 dated Nov. 11, 2016.

(Continued)

*Primary Examiner* — Hassan Kizou
*Assistant Examiner* — Abdullahi Ahmed

(57) ABSTRACT

Systems and methods for management of network slices in a communication network such as a 5th generation wireless communication network are provided. Network slicing formats of varying degrees of specificity are defined. An appropriate format may be selected for definition of a network slice. Different segments of a slice can be defined using different formats. Slice scoping, purposing, granularity, and resource usage are described. Slice creation and adaptation, and cloud resource management are also described.

32 Claims, 13 Drawing Sheets

(56) References Cited

U.S. PATENT DOCUMENTS

| | | | | |
|---|---|---|---|---|
| 2012/0233302 A1* | 9/2012 | Kallin | ................. | H04L 41/5025 709/221 |
| 2013/0303114 A1* | 11/2013 | Ahmad | ................. | H04W 16/14 455/406 |
| 2014/0269295 A1* | 9/2014 | Anumala | ................ | H04L 41/08 370/235 |
| 2015/0281073 A1* | 10/2015 | Kotha | .................. | H04L 45/745 370/392 |
| 2016/0006623 A1* | 1/2016 | Liu | ....................... | H04L 41/145 370/254 |
| 2016/0249353 A1* | 8/2016 | Nakata | ................. | H04W 28/16 |
| 2016/0353465 A1* | 12/2016 | Vrzic | ................... | H04W 12/06 |
| 2018/0242161 A1* | 8/2018 | Vulgarakis Feljan | ....................... | H04W 16/10 |

FOREIGN PATENT DOCUMENTS

| | | |
|---|---|---|
| CN | 103905523 A | 7/2014 |
| CN | 104639653 A | 5/2015 |
| WO | 2013110742 A1 | 8/2013 |
| WO | 2014173263 A1 | 10/2014 |
| WO | 2015021248 A1 | 2/2015 |
| WO | 2015071888 A1 | 5/2015 |

OTHER PUBLICATIONS

3GPP TR 22.891 entitled "Study on New Services and Markets Technology Enablers," Release 14, Version 1.2.0, Jan. 20, 2016.

ETSI GS NFV 001, "Network Function Virtualization (NFV); Use Cases", Oct. 2013.

ETSI GS NFV 002, "Network Function Virtualization (NFV); Architectural Framework", Oct. 2013.

ETSI GS NFV-SWA 001, "Network Function Virtualization (NFV); Virtual Network Functions Architecture", Dec. 2014.

Extended European Search Report dated Apr. 23, 2018 for corresponding European Patent Application No. 16838539.1 filed Aug. 19, 2016.

ETSI GS NFV-MAN 001, V1.1.1, European Telecommunications Standards Institute, "Network Functions Virtualisation (NFV); Management and Orchestration", Dec. 1, 2014.

ETSI GS NFV-EVE005, V0.1.0, European Telecommunications Standards Institute. "Network Functions Virtualisation (NFV); Ecosystem; Report on SDN Usage in NFV Architectural Framework", Aug. 14, 2015.

Young Lee et al, "Problem Statement for Abstraction and Control of Transport Networks; draft-leeking-teas-actn-problem-statement-00. txt", Internet Engineering Task Force, IETF; StandardWorkingDraft, Internet Society (ISOC) 4, Rue Des Falaises CH-1205 Geneva, Switzerla, Jun. 10, 2015, pp. 1-25, XP015106619.

\* cited by examiner

METHOD AND APPARATUS FOR NETWORK SLICING

CROSS-REFERENCE TO RELATED APPLICATIONS

This application claims priority to U.S. Provisional Application Ser. No. 62/208,118 filed Aug. 21, 2015, the contents of which are hereby incorporated by reference.

FIELD OF THE INVENTION

The present invention pertains to the field of communication networks and in particular to a method and apparatus for network slicing in communication networks.

BACKGROUND

Communication networks enabled by technologies such as Network Function Virtualization (NFV), and Software Defined Networking (SDN) can be flexibly organized so as to serve various customer demands. Network slicing has been proposed as a means to offer network services in wireless networks. Through the use of NFV, and network slicing, a dynamic network responsive to the immediate needs of the users can be provided. Various architectural and implementation issues remain to be addressed within the domain of network slicing for communication networks in order to properly define an architecture that is sufficiently scalable and reliable for next generation wireless networks.

Therefore there is a need for a method and apparatus for network slicing, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for network slicing. In accordance with embodiments of the present invention, there is provided a method for providing a network slice in a communication network. The network slice provides a separated portion of the overall network and is customized to a received set of customer demands. The method includes receiving at a slice creation and management entity (SCME), an indication of a set of requirements to be satisfied by the communication network for the one or more customers. The method may further includes defining a network slice to have attributes which are selected based on the set of requirements. The method further includes transmitting, by the SCME, instructions to a node in the communication network to allocate resources to the network slice having attributes determined in accordance with the selected attributes.

In accordance with embodiments of the present invention, there is provided an apparatus for providing a network slice in a communication network. The network slice is configured for use by one or more customers. The apparatus includes a processor operatively coupled to a memory; and a network communication interface. The apparatus is configured to receive an indication of a set of requirements to be satisfied by the communication network for the one or more customers. The apparatus is further configured to transmit instructions to a node in the communication network to allocate resources to a network slice having attributes determined in accordance with the set of requirements. The apparatus may further be configured to select the attributes of the network slice. The apparatus may be a slice creation and management entity (SCME).

In some embodiments, at least two segments of the network slice are provisioned. The segments may be contiguous. Each of the segments may have different attributes which are selected based on the requirements. In some embodiments, the at least two segments are contiguous. In other embodiments, at least one of the segments is non-contiguous.

In some embodiments, multiple network slice formats are defined, each format specifying a predetermined set of attributes. Network slices or network slice segments can be defined, and subsequently configured according to a selected one of the network slice formats. Each of the network slice formats can include a different combination of unspecified parameters and specified parameters, which are selected from a set of potential parameters. Values for the specified parameters are selected and assigned as part of the slice or slice segment definition.

The network slice can be provided by generating a new network slice or by adapting an existing network slice. The network slice can be nested within another network slice. The network slice can be provided prior to receiving a customer request, in which case the customer requirements are anticipated customer requirements.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
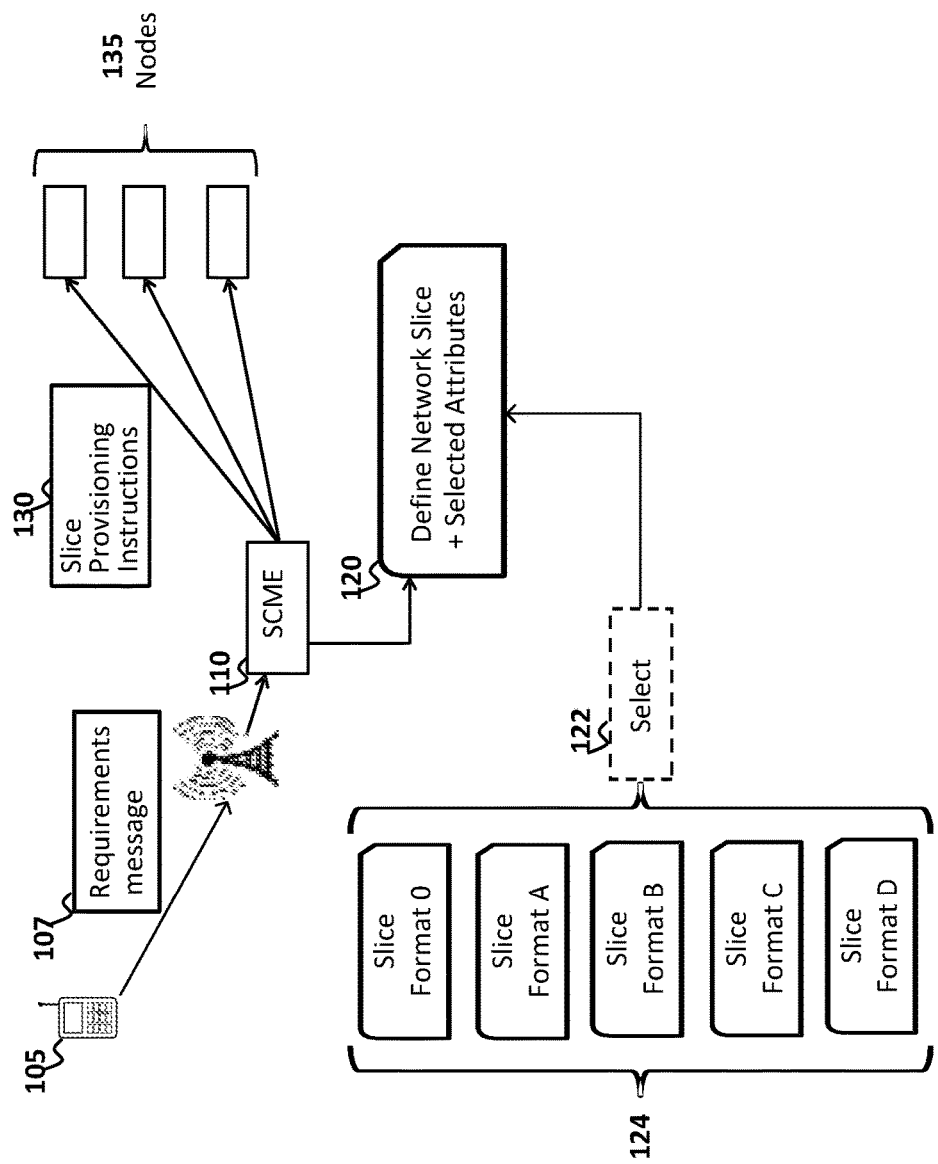
FIG. 1 illustrates a method for providing a network slice in accordance with one embodiment of the present invention.

As used herein, a "network" or "communication network" may service various devices including but not necessarily limited to mobile devices. Such a network may include a radio access portion and backhaul portion. The network may further comprise various virtualized components as will become readily apparent herein. A primary example of such a network is a 5$^{th}$ generation mobile network, for example as defined by the Next Generation Mobile Networks Alliance, which is reconfigurable and capable of operating according to network slicing, as described below.

As used herein, the term "User Equipment" (UE) is used for purposes of clarity. However, the UE may refer to one of a variety of devices, such as mobile devices, stationary or mobile machine-type devices, or the like, which communicate with an access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

Network slicing refers to a technique for separating different types of network traffic which can be used in reconfigurable network architectures, such as networks employing network function virtualization (NFV). A network slice as defined in 3GPP TR 22.891 entitled "Study on New Services and Markets Technology Enablers," Release 14, Version 1.2.0, Jan. 20, 2016, is composed of a collection of logical network functions that supports the communication service requirements of particular use cases. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In contrast with having all mobile devices connect with the network through a mobility management Entity (MME) (which in a virtualized environment may be referred to as a Mobility Management Function (MMF)) determined by a network infrastructure component (e.g. base station, access point, eNB, or a selection function instantiated thereupon), network slicing allows the instantiation of separate network slices respectively directed toward different network services. This allows for separation of different types of traffic, the different types of traffic potentially having different packet processing requirements and/or QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

According to embodiments of the present invention, the communication network architecture is based on a network function virtualization (NFV) framework. The NFV framework can be used to define a plurality of virtual network functions (VNFs), each of which can correspond to a function enabling operation of a communication network. For example a VNF can provide the functions of a router, switch, gateway, firewall, load balancer, server and the like. The function is virtualized in the sense that, rather than being performed using dedicated hardware, the function may be implemented using software which causes a generic set of hardware components, such as computing, storage and networking resources, to implement the function. As such, VNFs may be instantiated on an as-needed basis using available virtual resources. NFV and virtual network functions architecture is described in ETSI GS NFV 001 entitled "network function virtualization (NFV); Use Cases", October 2013 and ETSI GS NFV 002 entitled "network function virtualization (NFV); Architectural Framework", October 2013, for example.

A NFV management and orchestration (MANO) entity may be used to instantiate the necessary network functional components in order to suitably provide the service identified by a network service (NS) request. The instantiation of a network service request is described by a virtual network function forwarding graph (VNFFG) which defines the set of network functions that are required to provide the requested service. The VNFFG contains a network forwarding path (NFP) that defines a sequence of actions that are to be performed, for example by a collection of VNFs, to provide the requested service.

To provide context to aid in the understanding of network slicing, and the concept of a network slice, it is helpful to understand that in heterogeneous networks in addition to a plurality of different types of nodes covering different locations, different infrastructure providers may own different parts of what is considered as an access network (or even parts of a core network). A Telecommunications Service Provider (TCSP), who provides service to a final customer, such as an M2M Service Provider (M2M SP) or another virtual service provider, may wish to provide a simple network to the M2M SP. As such, the TCSP will create a virtual network having virtual nodes and virtual links between the nodes. The M2M SP only needs to interact with the virtual network (VN). However, the VN (both nodes and links) need to be mapped to physical infrastructure. The VN may only use a subset of the physical nodes, and each physical node that the VN uses may not be fully used by that VN. It should also be understood that the M2M SP may make use of more than one TCSP, allowing it to create a virtual network spanning across different networks, effectively having a network slice that is a superset of the resources of a single TCSP. If certain bandwidth requirements are set for each logical link, then percentages of physical links are allocated to create the virtual link. This may also include aggregating links to create a logical link of greater capacity than a single physical link. Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure.

In some embodiments, network slicing relates to the ability of a network, such as a $5^{th}$ generation communication network accessible by mobile devices, to provide multiple logical network slices on demand, with each network slice operating as a substantially separate network viewed as a service. The capabilities and operating parameters of each network slice may be customized to the service requirements. Configuration of the network slices may include one or more of: software defined networking, network function virtualization and network orchestration.

A portion of communication network resources may be allocated for use by a network slice. These resources can include radio access communication resources, node-to-node communication resources, computational resources, and storage resources. Resources may further include network infrastructure resources such as management plane resources, control plane resources, and data plane resources. Resources may include hardware resources, such as portions of computer processing capabilities, or communication resources, such as portions of communication links partitioned by time, frequency, spreading code, or a combination thereof. Nodes in the same network slice may be connected by logical pipes, for example.

Embodiments of the invention are applicable to network systems in which different entities operate different portions of a communication network and/or provide different services. For example, one entity may provide radio access network resources, another entity may provide backhaul connection resources, and yet another entity may be a service provider that acquires rights to use the equipment and resources of other entities and packages and sells services to customers which are supported using these resources. Entities may own physical communication network equipment, usage of which is provided to others for a consideration such as a monetary fee. Some entities may own limited communication network equipment, while others may not own any communication network equipment. Entities may acquire, repackage and re-sell access to communication network equipment. Network slicing as described herein may be used to support such network systems.

Embodiments of the present invention provide for a method and apparatus for network slicing. The network slice is configured, for example, to provide a functionally separate network, such as a virtual network, for satisfying a given set of customer demands. Having reference to FIG. 1, a method according to one embodiment includes receiving an indication of a set of requirements to be satisfied by the communication network for the one or more customers or customer devices 105. The requirements can be received in the form of a message 107 originating from a customer, customer device or a representative thereof. The requirements can be received by a slice creation and management entity (SCME) 110. The method further includes defining 120 a network slice to have attributes which are selected based on the set of requirements. The method further includes transmitting instructions 130 to at least one node 135 of the communication network to provision that node to assist in providing the network slice having the selected attributes. The attributes may be selected prior to transmitting the instructions.

In various embodiments, the instructions direct at least one node to allocate a determined amount of network resources to the network slice, the amount of network resources determined based on an anticipated data traffic demand to be accommodated by the network slice.

In some embodiments, defining the network slice includes selecting 122 a network slice format out of a set 124 of predetermined network slice formats, and defining the network slice according to the selected network slice format. Each of the predetermined network slice formats specifies a predetermined set of the attributes for the network slice. A network slice format acts as a standardized template for specifying at least some and potentially all attributes of the network slice.

In some embodiments, the network slice comprises a plurality of segments connected in series, and the method further includes separately defining at least two of the segments to have attributes which are selected based on the set of requirements. In some embodiments, defining one, two, or more of the segments includes selecting a network slice format out of a set of predetermined network slice formats, and defining each of the one, two, or more segments according to a network slice format selected for that segment. Two or more of the segments can be defined separately from each other in this manner.

In some embodiments, the network slice comprises a plurality of segments which are non-contiguous. For example, a virtual network may be provided which spans two networks. A first segment and a third segment are provided within a first network. The first and third segments are connected by one or more other segments which are provided within a second network. As such, the first and third segments are connected but non-contiguous.

Figure 2:
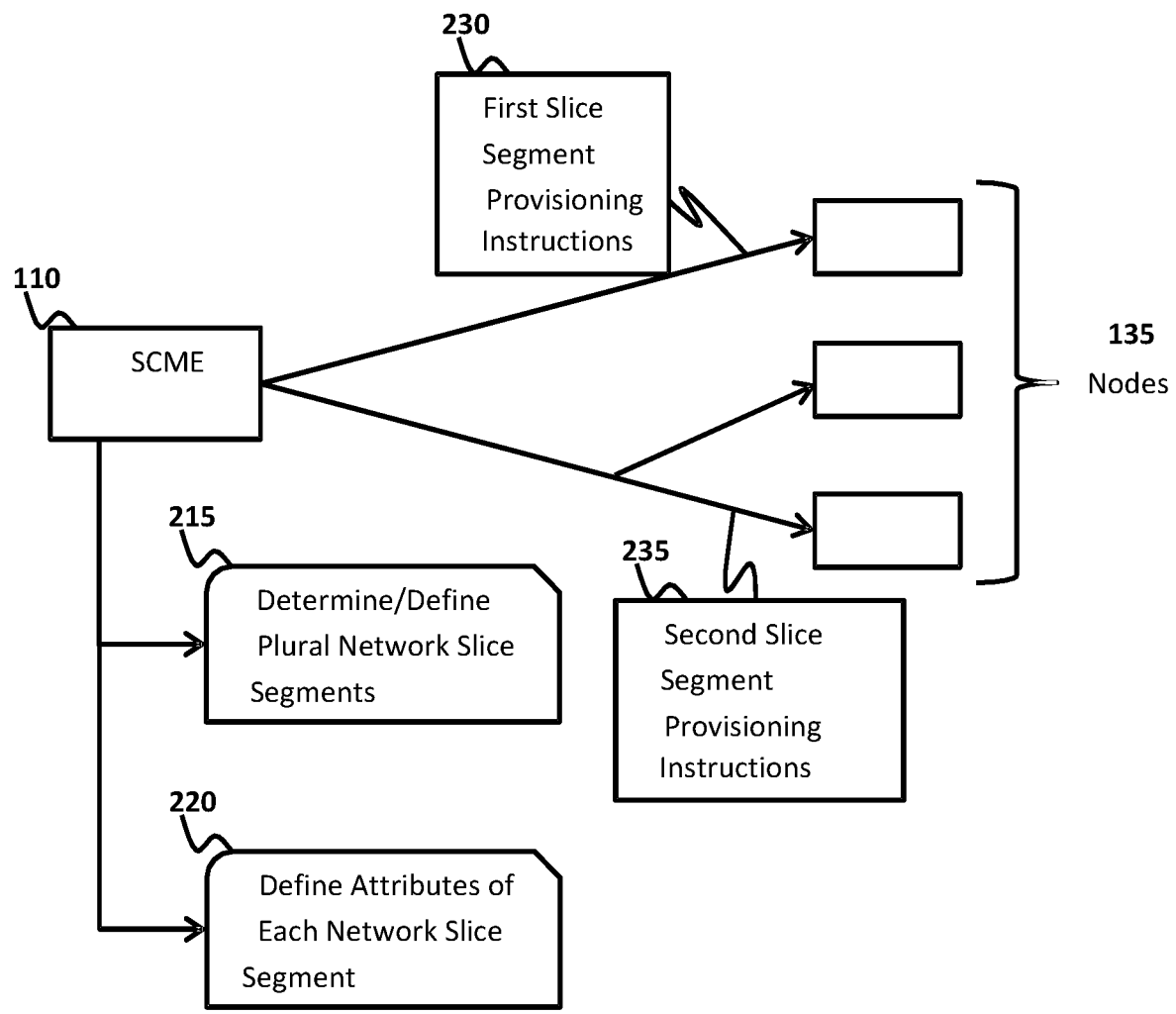
FIG. 2 illustrates a method for providing a network slice in accordance with another embodiment of the present invention.

Having reference to FIG. 2, a method for network slicing using slice segmentation is illustrated. This method may be used in a variation of the method of FIG. 1 with respect to operation of the SCME 110. The method includes determining or defining 215 a plurality of network slice segments which are to be coupled to form a network slice. The method further comprises defining 220 attributes of each of the network slice segments, the attributes being selected based on a received set of requirements. The attributes of each network slice segment may be defined separately. The method further comprises transmitting instructions to multiple different nodes 135 of the communication network to provision those nodes to assist in providing the different segments. For example, instructions 230 for provisioning a first slice segment can be transmitted to a first set of nodes, and instructions 235 for provisioning a second slice segment can be transmitted to a second set of nodes. The two sets of nodes may or may not overlap.

Provisioning of nodes may be performed in accordance with a network slice instantiation operation, which instantiates the network slice in the communication network. For example, by provisioning multiple network nodes to operate in a specified manner, the network slice may be instantiated. Configuring of nodes to operate in a manner which instantiates a network slice may include configuring the nodes to handle incoming data transmissions, transmit data, and process data in specified ways. Portions of the communication, computing and storage resources of a node may be dedicated to support of a network slice. A node may be used to instantiate one or more functions which form part of the network slice. The functions may perform as virtual nodes of the network slice, for example.

According to various embodiments, the method for network slicing may be performed automatically by one or more control or management nodes associated with the communication network. A management node includes at least a microprocessor operatively coupled to memory and a communication interface configured for transmitting instructions to other network nodes. Likewise, an apparatus provided in accordance with embodiments of the present invention may be a control or management node which is configured to at least receive indications of customer requirements, define network slices, and transmit instructions to other nodes of the communication network, as described above. The apparatus may correspond to a real or virtualized, centralized or decentralized, computing resource associated with the communication network.

Figure 3:
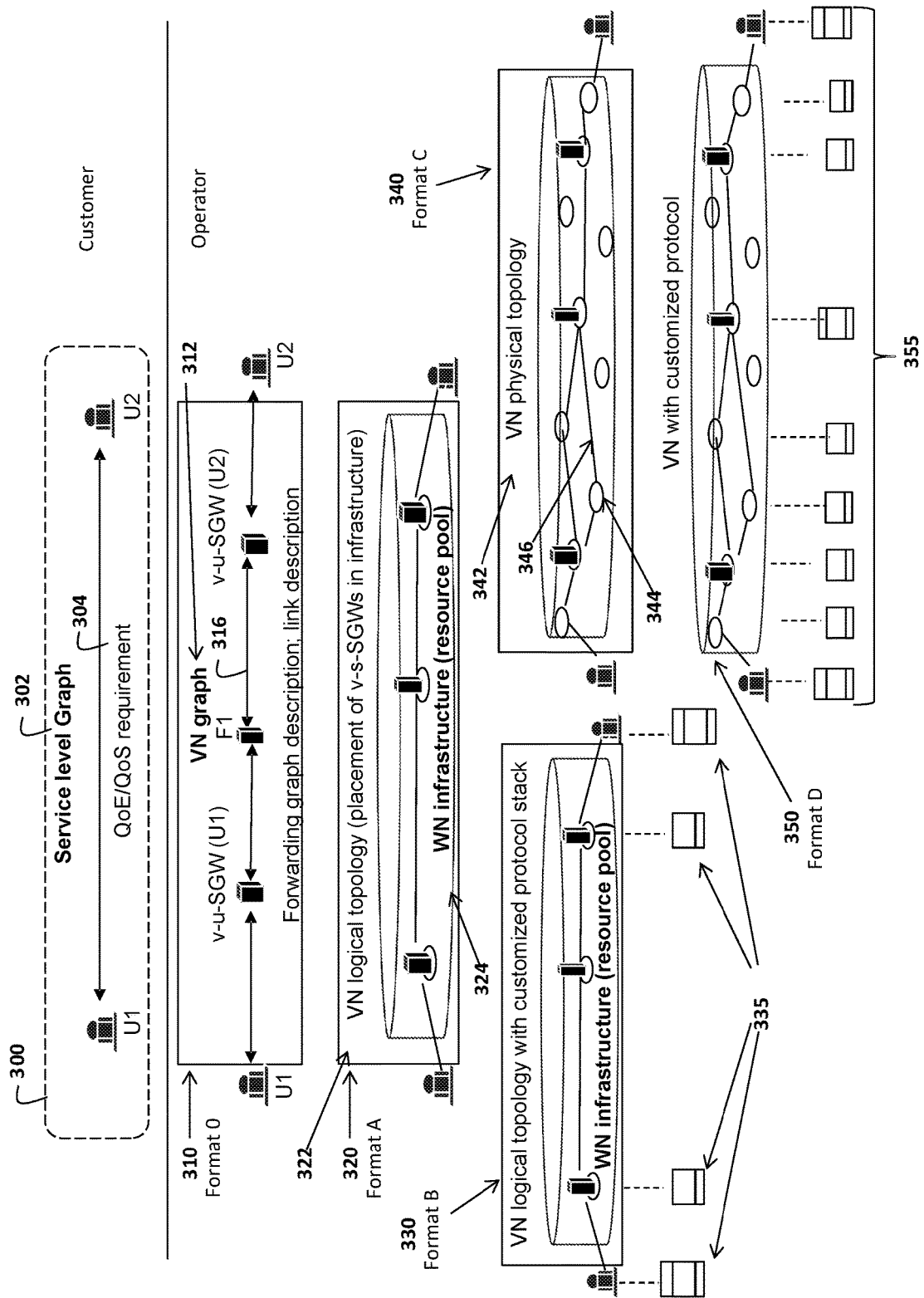
FIG. 3 illustrates network slice formats that may be provided in accordance with embodiments of the present invention.

FIG. 3 illustrates different network slice formats that may be provided in accordance with the present invention, in support of an example user-to-user connection. Some or all of the illustrated network slice formats may be made available for use in the network, with a particular network slice format being selectable based on relevant criteria, such as customer requirements. The different network slice formats have different levels of specificity. For example, some slice formats may specify a particular attribute whereas others may leave the particular attribute unspecified. When an attribute is unspecified, it may be specified at a later time, for example at runtime. This approach allows for dynamic determination of the attribute following slice creation. Unspecified attributes may be specified at runtime by an implementation function. Examples of attributes include logical links, logical link identifiers, forwarding rules, protocols used by the slice, and the like.

FIG. 3 illustrates a requested customer network connection 300 which is to be supported using a network slice of a particular format. The customer network connection 300 connects a first user (U1) to a second user (U2). The users may be human end users, applications, machine-to-machine (M2M) devices or applications, or the like. Particular requirements such as Quality of Service (QoS) or Quality of Experience (QoE) requirements 304 may be specified for the connection 300. The customer network connection 300 may be specified by a service-level graph 302. One of the illustrated network slice formats is selected to support the customer network connection 300.

In some embodiments, the service-level graph 302 describes a communication pattern of the customer, and the service-level graph may be supplied by the customer. For example, the service-level graph may specify how entities (such as source, destination, or customer function elements) communicate in a general way, for example with respect to entity connection and ordering of entity connections. The graph may have a mesh, tree or linear layout, for example depending on the customer's business model and logic.

FIG. 3 illustrates "slice format 0" 310 as one of the selectable network slice formats. This format specifies one or more service-specific function elements and/or required function elements. When more than one function element is specified, the format may specify the ordering of the function elements. The format may include or refer to a virtual network (VN) graph 312, including a description of a forwarding graph and a description of the links between nodes of the forwarding graph. The forwarding graph may include a description of the specified function elements as graph nodes, and their interconnection as graph links 316 interconnecting the graph nodes. It is noted that a forwarding graph may be more complicated than the illustration, for example having a mesh structure or other structure. In an example embodiment and as illustrated, the VN graph specifies a virtual user-specific serving gateway node (v-u-SGW (U1)) servicing a first user. The gateway node v-u-SGW (U1) is operatively coupled to a function element node (F1). The function element node F1 is further operatively coupled to a virtual user-specific serving gateway servicing a second user (v-u-SGW (U2)). Other functions and/or nodes may be provided by the network operator as necessary, according to the customer's service requirements/profile.

The VN graph of slice format "0" can be different from the customer-supplied service-level graph. The VN graph may include operator-determined, networking-specific functions, and an indication of element ordering and/or element interconnections, for both elements held in common with the service-level graph and elements specific to the VN graph. The functions in the VN graph may be determined by the network operator based on a desired level of customer service. For example, in FIG. 3, the slice format "0" VN graph includes a function "F1" which does not exist in the service-level graph.

The VN graph may correspond to a general or relatively abstract representation of the virtual network slice to be created for the customer. A maximal practical number of details related to implementation of the slice are left unspecified, for later determination at runtime. Unspecified details may include mapping of nodes and links to physical resources, for example. This offers flexibility in implementing the VN graph of this format. Other slice formats described below specify more detail, which allows pre-customization of the slice but limits flexibility of implementation at runtime. Slice formats illustrated progressively lower in FIG. 3 specify more detail than slice formats illustrated higher. A slice format which appropriately balances pre-customization and flexibility of implementation may be selected depending on various parameters.

FIG. 3 further illustrates slice format "A" 320 as one of the selectable network slice formats. This format specifies the same information as slice format 0, and further specifies placements and graphical layout of the specified function elements. As illustrated, the format 320 may specify a virtual network (VN) logical topology 322 indicative of the placement of function elements such as the v-u-SGW elements within the network infrastructure. The function elements may be instantiated using resources from a resource pool, corresponding to a wireless network (WN) infrastructure 324.

In various embodiments, in relation to slice format "A", various network nodes (NNs) of the underlying physical network may be configured to have particular forwarding rules instructing the NNs to forward data between function elements in a specified manner. The configuration may be performed by a control element of the communication network such as a traffic engineering controller. A forwarding rule may be associated with a slice identifier and a logical link identifier. The forwarding rule may, for example, specify the network address of the next function point. A function point corresponds to a network node where a function element is instantiated. A function element can be a functional block of a process such as a networking, data processing or business process. For example, initially or following processing by a given function point, data may be transmitted to a next function point, which may be a virtual service specific packet data gateway (v-s-PGW) of the network slice. In various embodiments, the NN may have pre-downloaded or acquired a local routing/switching table to facilitate data handling according to the forwarding rules. A logical link may represent a virtual connection from one or more function points to another function point, a virtual connection from one function point to one or more other function points, or a virtual connection from one or more function points to one or more other function points.

FIG. 3 further illustrates slice format "B" 330 as one of the selectable network slice formats. This format specifies the same information as slice format "A", and further specifies one or more protocols to be used by the network slice. For example, a service-specific data plane protocol and/or customized protocol stack may be specified. The data plane protocols may include OSI Layer 2 and/or Layer 3 protocols, for example, such as transport protocols. Protocol stacks 335 are specified for use by various users and at select function elements (specifically SGWs and PGWs) of slice format "B". Specified protocols may be implemented using a Software-Defined Protocol (SDP) approach.

In various embodiments, in relation to slice format "B", each NN may be configured, for example by a SDP controller, to have a data plane process protocol associated with the network slice. The data plane process protocol may be associated with a slice identifier, a logical link identifier, and a forwarding rule, for example specifying the network address of the next function point, and a protocol unit combination identifier, such as an index lookup identifier. The logical link identifier indicates that the protocol is to be applied over a specified logical link, such as along physical communication paths implementing the logical link. The protocol unit combination identifier indicates a particular customized combination of protocols to be used for communication between nodes in the network slice. Customization of a protocol stack may include specifying one or more protocols, such as a transport protocol, to be used in the protocol stack by specified network nodes.

FIG. 3 further illustrates slice format "C" 340 as one of the selectable network slice formats. This format specifies the same information as slice format "A", and further specifies physical bandwidth allocation for use within the slice. The slice format "C" further specifies a virtual network physical topology 342 used by the network slice. The physical topology may specify, in addition to the function points of the VN logical topology, intermediate physical network nodes (NNs) 344 and one or more communication paths 346 between the function points. Physical bandwidth allocation along the paths may also be specified.

Further, in relation to slice format "C", each NN may be configured to implement a forwarding rule. The forwarding rule may be associated with a slice identifier, a logical link identifier, and a forwarding rule, for example specifying the network address of the next NN.

FIG. 3 further illustrates slice format "D" 350 as one of the selectable network slice formats. This format specifies the same information as slice format "C", and further specifies one or more protocols to be used by the network slice, as described with respect to slice format "B". As such, slice format "D" may correspond to a combination of slice format "B" and slice format "C". Alternatively slice format "D" may include other features in addition to those of slice formats B and C. For example, slice format "D" may specify a protocol for individual physical links or physical link groups such that the physical links, which are used for the same logical link, may have different protocols running over them. Slice format "D" may specify a customized protocol stack or portion thereof to be implemented by end users, function points (including SGW and PGW nodes), and intermediate nodes. In various embodiments, in relation to slice format "D", each NN may be configured to implement a forwarding rule and a data plane process protocol. FIG. 3 illustrates protocol stacks 355 specified for use by various users and at function points and other nodes of slice format "D".

Figure 4:
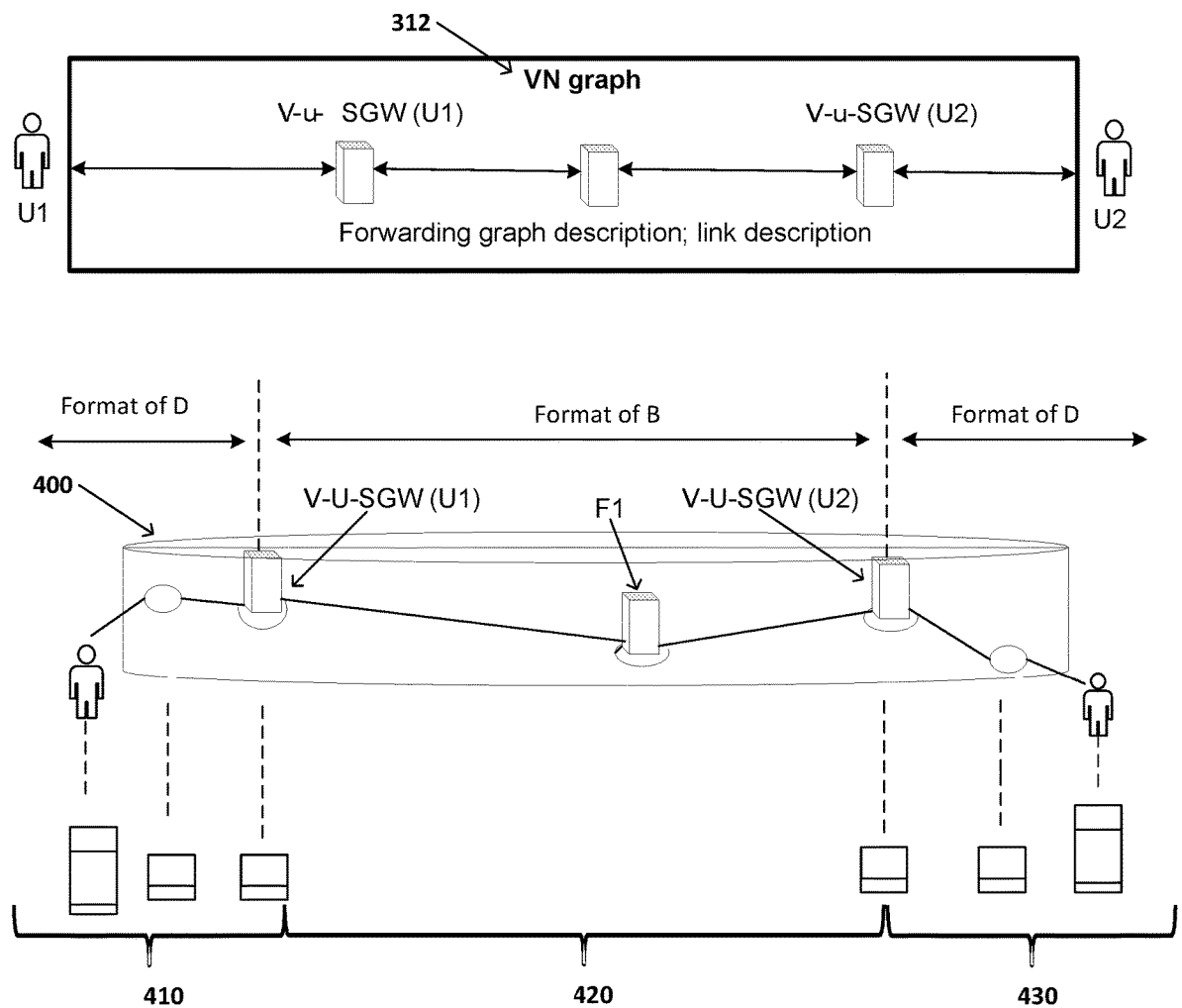
FIG. 4 illustrates a segmented network slice in accordance with an embodiment of the present invention.

Embodiments of the present invention provide for a segmented network slice. A segmented network slice corresponds to a single network slice which is divided into multiple segments which are coupled together, for example in series, to provide an end-to-end or edge-to-edge network slice. The segmentation of a slice may be configured during network slice definition. For example, as illustrated in FIG. 4, a segmented slice 400 may include a first slice segment 410 coupled between a first user and a first SGW serving the first user, a second slice segment 420 coupled between the first SGW and a second SGW serving a second user, and a third slice segment 430 coupled between the second SGW and the second user.

In various embodiments, slice segmentation may be performed when creating a slice using network resources from multiple different providers. For example, a first network slice segment may be created using resources owned by a first entity, and a second network slice segment may be created using resources owned by a second entity.

Each network slice segment of the segmented slice may be configured with its own particular set of attributes. Furthermore, each network slice segment of the segmented slice may be associated with its own particular slice format, and formats may differ between segments. The slice format for each segment may therefore be selectable during definition of the slice. For example, in FIG. 4, the first and third slice segments 410 and 430 may correspond to slice format "D", while the second slice segment 420 may correspond to slice format "B". Protocols for the slice format "D" segments may also be specified, as described above. In various embodiments, different network slice segments may be configured separately. In some embodiments, a first set of one, two or more network slices may be configured together and a second set of one, two or more network slices may be configured together and separately from the first set. By way of example, the collection of segmented network slices in FIG. 4 further illustrates an implementation of a virtual network graph 312, including placement of the v-u-SGW (U1), F1, and v-u-SGW (U2) elements.

In one embodiment, a segmented network slice may be used to provide end-to-end connectivity. For example, a first segment may provide connectivity to a first user in a first city, a third segment may provide connectivity to a second user in a different city, and a second segment may provide connectivity between the first and third segments.

In some embodiments, the scope of a network slice, for example as an end-to-end or edge-to-edge slice may be configurable during initial generation or subsequent adaptation of the network slice.

In various embodiments, an end-to-end network slice ends at, and includes, end devices such as mobile devices (UEs), such as M2M devices. In one embodiment, each end device may be associated with an identifier such as a universal device identifier, a customer identifier or a service identifier. Associating an end device with an identifier may include programming the identifier into a predetermined and labelled memory location of the device. For a slice having slice format "A", the end devices may be also be associated with a slice identifier. The association may be performed via off-line configuration prior to device deployment, or on-line configuration, for example using over-the-air programming. For a slice having slice format "B", the end devices may be associated with both a slice identifier and a data plane process protocol unit combination identifier. The protocol unit combination identifier may indicate the particular customized combination of protocols used for communication between nodes in the network slice. For a slice having slice format "C", end devices may be associated with a slice identifier and a dedicated access link resource identifier. The dedicated access link resource identifier may indicate a radio bearer, for example. For a slice having slice format "D", the end devices may be associated with a slice identifier, a data plane process protocol unit identifier, and a dedicated access link resource identifier.

For an off-line association, a UE may be configured with a slice ID prior to joining the network. For example, a customer-specific network slice can be created and a slice ID generated for the customer. A UE belonging to or associated with the customer can be informed of the slice ID. When the UE joins the network, the UE provides the slice ID to a network operator and the UE is attached to the slice.

An example of on-line association follows. Some generic slices may be pre-defined for different service classes (e.g. M2M service, MBB service). A UE using such an M2M service can be associated with the corresponding slice ID when it joins the network. Subsequently, the UE may want to use the MBB service. In response, the network operation hands over the UE to the MBB slice by associating the UE with the MBB slice's identifier.

The identifiers for end devices may reflect operating parameters of the end-to-end network slice. For example, the identifiers may take on values which reflect operating parameters of the overall network slice, or values which reflect operating parameters of a segment of the network slice to which the end device belongs.

In various embodiments, an edge-to-edge network slice ends at the network edge, and excludes end devices such as user equipment or M2M terminals. End devices may attach to the edge-to-edge network slice through an edge node. Attachment of a device to a network slice may proceed in a comparable way to attachment of a mobile device to a communication network. The edge node may be a radio access node, wired or wireless access point, or the like, as would be readily understood by worker skilled in the art.

Network slices may be provided for various purposes. A network slice may be instantiated upon demand or in anticipation of a demand for the network slice. A network slice may be dedicated to a particular connection, a customer, a group of customers, a network operator, or a group of network operators. The network slice may be scalable to a range of applications. The computing, communication and/or storage resources accessible by the network slice may be adjustable to meet the current requirements of the network slice.

In some embodiments, a network slice may be instantiated and configured to provide dedicated service to a particular customer or group of customers, such as end users. The network slice may provide a virtual network for use by the particular customer or group of customers.

In some embodiments, a network slice may be instantiated and configured to provide an operator service network. The operator service network may be a virtual network used by a network operator to provide communication services to end users. For example, each of a group of network operators may be assigned one or more network slices. Each of the assigned network slices may be used to provide services to specific customers or customer groups served by the network operator.

In some embodiments, a network slice may be instantiated and configured to manage network operations. For example, a network slice may be configured to host functions which perform resource allocation operations and/or other network management operations for the network. In one embodiment, the network control plane can behave as an operator service or collection of operator services. Operator services may thus be control plane functionalities. In one embodiment, some or all control traffic and control functions of the network can be handled by functions which are held in one or more specific management network slices. The network management plane can therefore be virtualized and implemented using network slicing.

In various embodiments, a network slice may be a user-to-user network slice or a machine-to-machine network slice. A network slice may be dedicated to a particular application, set of end devices, operator, service offering, or virtual network, for example.

Figure 5:
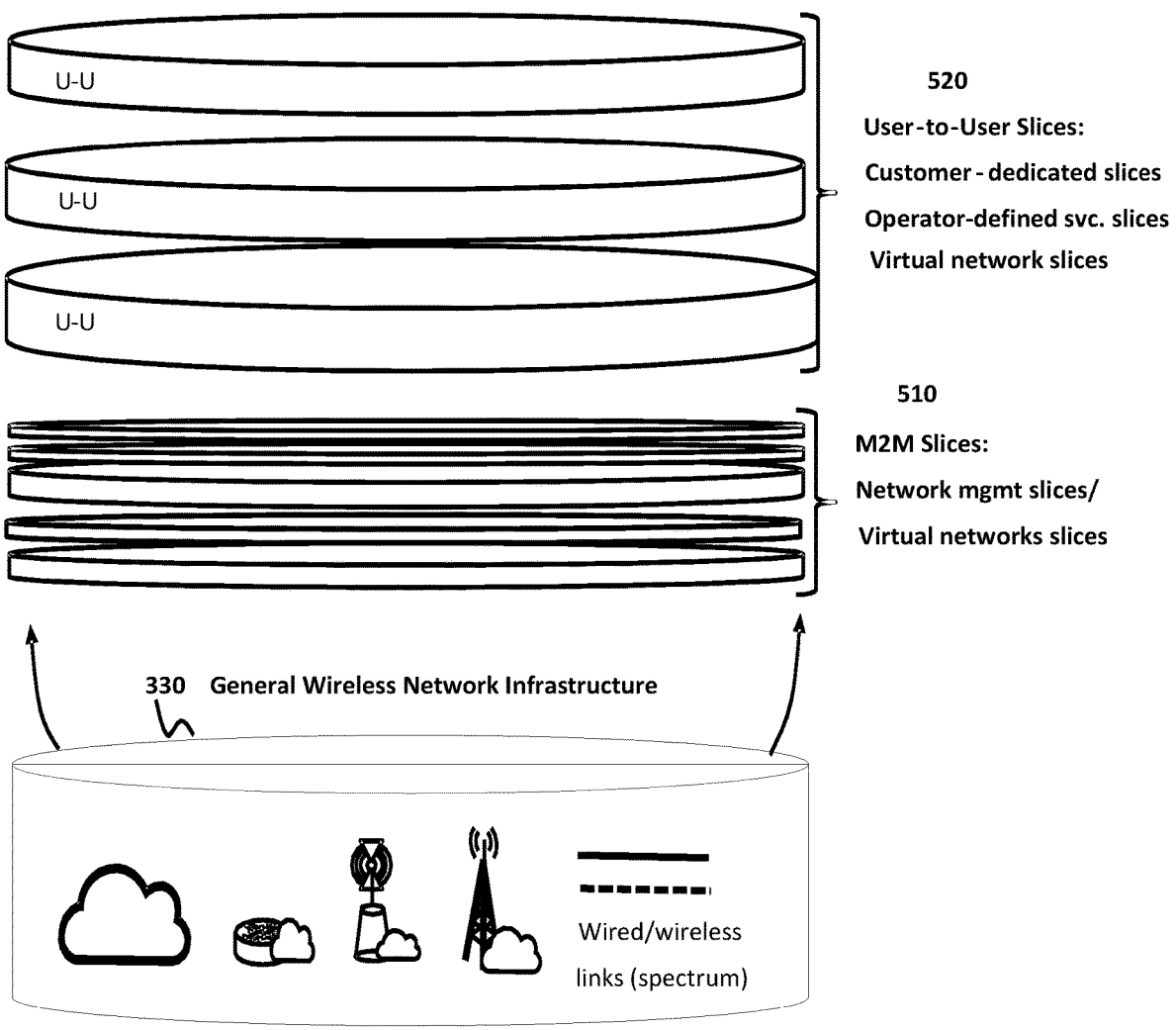
FIG. 5 illustrates an example of M2M network slices and user-to-user network slices, in accordance with an embodiment of the present invention.

FIG. 5 illustrates, by way of example, a first plurality 510 of M2M network slices and a second plurality 520 of user-to-user network slices. The M2M network slices may include network management slices and slices dedicated to serve virtual networks. The user-to-user network slices may include slices dedicated to particular customers. The user-to-user network slices may include slices having operator-defined services. The user-to-user slices may include slices having dedicated virtual networks. The network slices are provided using the infrastructure resources of a general wireless network infrastructure 530.

In various embodiments, the granularity of a network slice may be varied. In particular, the network slice may be directed toward an application that has a coarser or finer granularity. The level of granularity corresponds to the number of different customers using the slice, with progressively coarser granularity corresponding to progressively more customers. For example, a fine-granularity slice may be dedicated to a single customer, such as an industry customer, individual customer, very important person (VIP), sports team, company, conference, event, venue provider, or the like. In some embodiments, the customer may provide and/or consume one or more services at one or more end devices.

In some embodiments, a network slice may operate as a bridging slice. The bridging slice is configured to connect customers to other services and/or network slices. In one embodiment, in the case of a VIP, the other network slices may also be adapted to the needs of the VIP. In some embodiments, a bridging slice may be dedicated for use by a single customer.

In some embodiments, a network slice may be dedicated to a group of services sharing similar characteristics and requirements, such as QoS or QoE requirements. This type of network slice may be referred to as a per-service-type slice, and has a coarser granularity than a customer-dedicated slice. The services may be directed toward industry customers, individual customers, or both. For example, a network slice may be dedicated to serving a set of M2M or Machine-Type Communication (MTC) services. For example, multiple different customers deploying wireless meters may be served by a per-service-type network slice. As another example, a network slice may be dedicated to serving a set of Mobile Broadband (MBB) services.

In some embodiments, a network slice may serve a single application. The application may support an individual customer such as an industry customer, or a group of customers. For example, the network slice may serve a smart grid service application, such as a smart metering application. As another example, the network slice may serve a private social networking application, such as a video conference call application.

Figure 6:
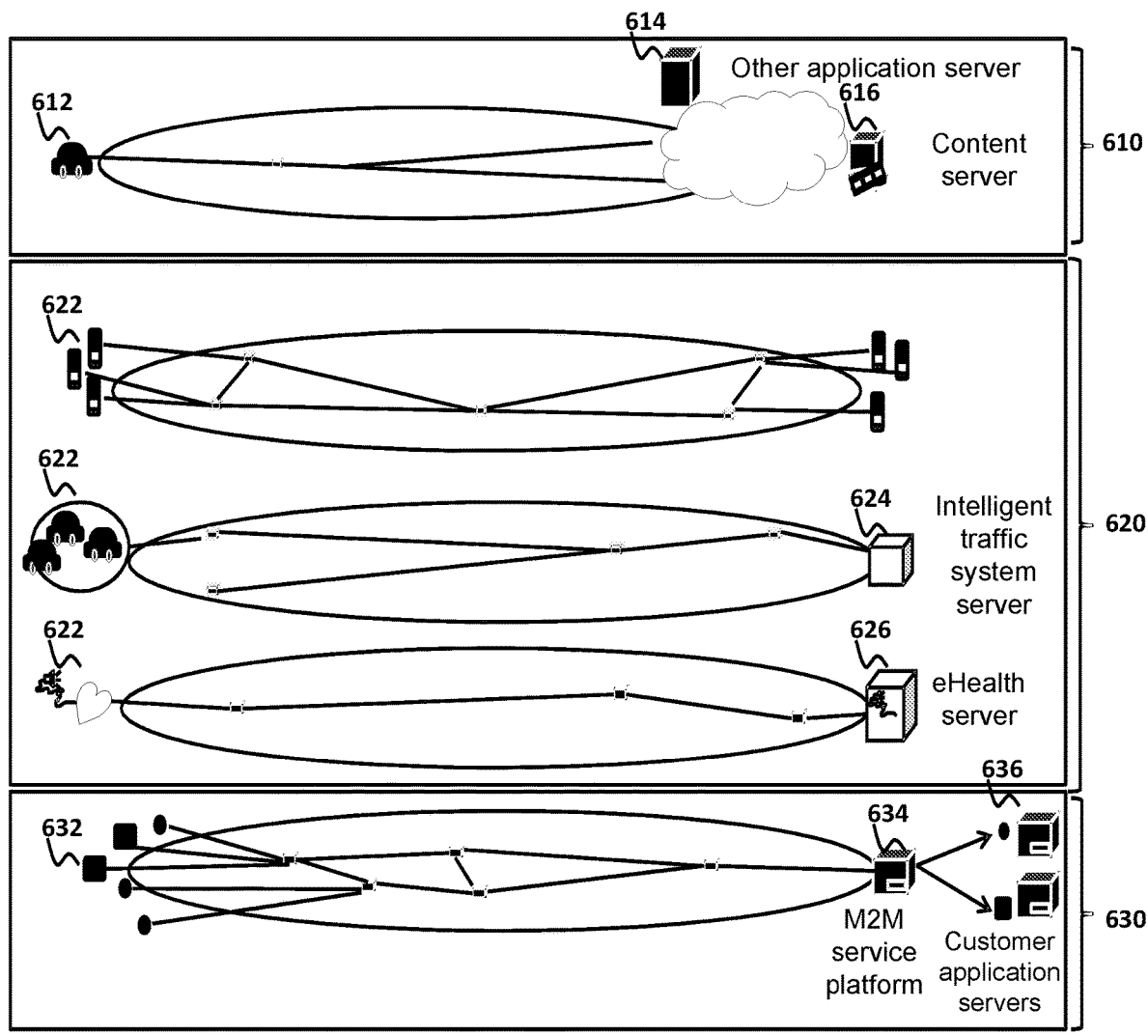
FIG. 6 illustrates network slices of varying granularity, in accordance with an embodiment of the present invention.

FIG. 6 illustrates example slices of varying granularity, including a per-customer slice 610, several per-service slices 620, and a per-group-of-service slice 630. The per-customer slice 610 may connect a particular end customer 612 to an application server 614 and/or content server 616, for example. The per-service slice 620 may connect end devices 622 to one another and/or to a server providing the service. For example, a per-service slice may connect end devices such as automobile MTC devices with a server such as an intelligent traffic system server 624. As another example, a per-service slice may connect end devices such as personal health monitoring devices to an eHealth server 626. The per-group-of-service slice may connect various end devices 632 to an M2M service platform 634, which in turn may connect to customer application servers 636.

In various embodiments, network slices such as per-service-type network slices may be created as follows. A common SCME controlled by an operator may be used to create and/or manage network slices. As used herein, "SCME" refers to a slice creation and management entity, which may be a function or set of functions supported by computing, control and/or management resources in the network. In various embodiments, SCME includes Software Defined Topology (SDT), Software Defined Resource Allocation (SDRA), and Software Defined Protocol (SDP) capabilities. In a given SCME, a selectable combination of some or all of SDT, SDRA and SDP may be used. The common SCME may be implemented outside of the network slices being created, for example using resources belonging to another network slice used for operator control purposes. Created and/or managed network slices may include an internal (intra-slice) SCME component. In some embodiments, internal SCME components operate independently from the common SCME. In other embodiments, the internal SCME components are operatively coupled to the common SCME, and the common SCME component is configured to control, via instructions sent to the internal SCME components, the configuration of the created/managed network slices. This structure allows SCME functionality to span the network slices. A network slice may be managed using the common SCME in combination with the internal SCME of the network slice. For example, managing the network slice may include allocating network resources to the network slice and/or adjusting assigned values of the unspecified parameters of the selected network slice format.

In some embodiments, a network slice may be associated with its own Software-Defined Topology (SDT) management entity, and additionally may be associated with its own Software-Defined Protocol (SDP) management entity. In some embodiments, a network slice may be associated with its own Software-Defined Resource Allocation-Access Link (SDRA-AL) management entity. SDRA can allocate wireless (radio), wired, and/or optical and resources. Within a network slice, an internal SCME component may be operated for managing in-slice services and/or applications.

Figure 7:
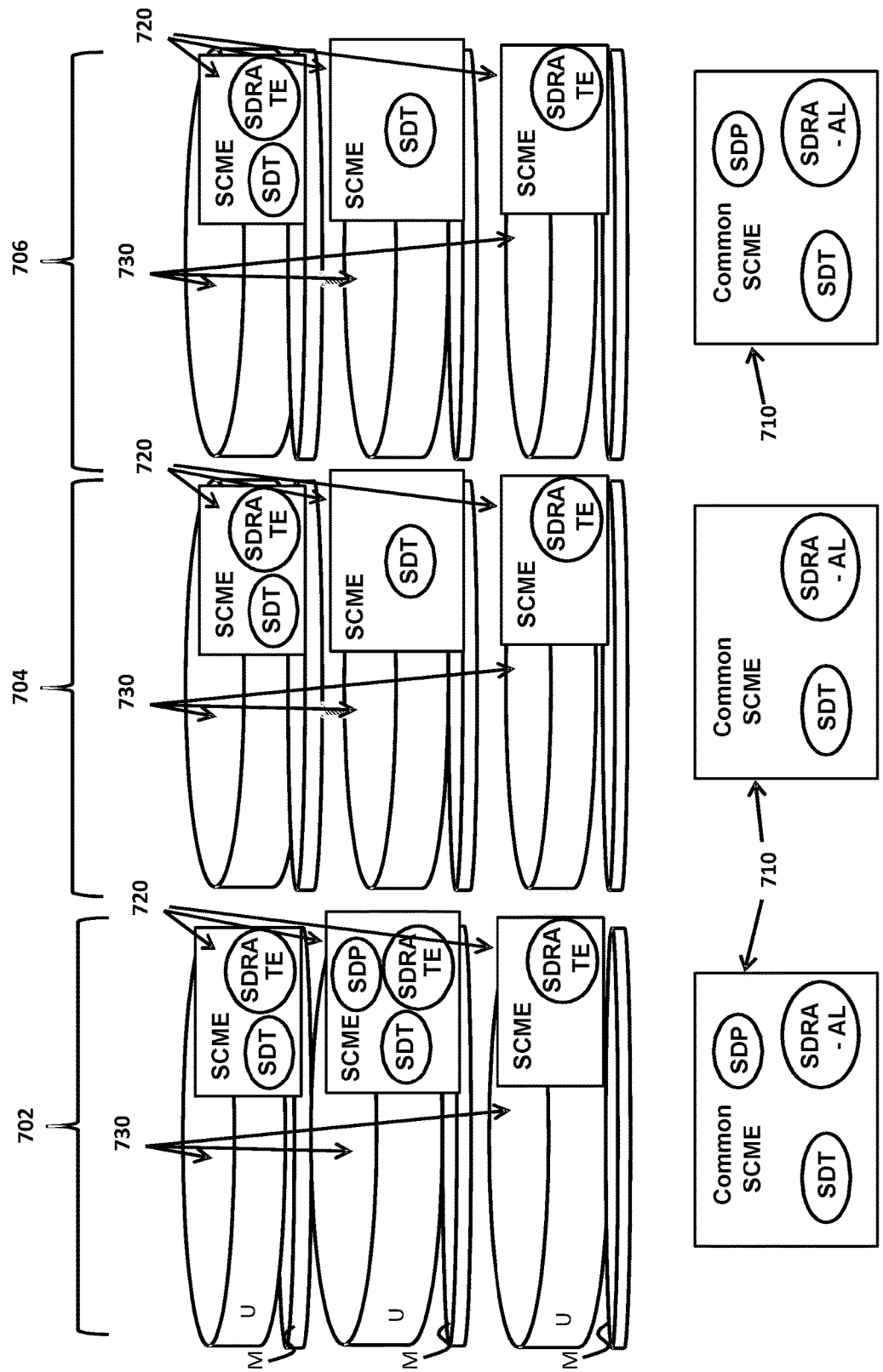
FIG. 7 illustrates a configuration of common slice creation and management entity (SCME) components along with internal SCME components of various network slices, in accordance with an embodiment of the present invention.

FIG. 7 illustrates three side-by-side example configurations 702, 704, 706 of common SCME components 710 along with internal SCME components 720 of various network slices 730. These configurations may be used to create per-service-type network slices. Each common SCME component 710 may be operatively coupled to a particular set of internal SCME components 720. In some cases, such operative coupling may not be necessary. Each network slice 730 includes a user plane (U) and a management plane (M). In each example configuration, the common SCME component includes at least the capabilities (such as SDT, SDP and SDRA capabilities) of the internal SCME components. The configurations are provided using resources of a general wireless network infrastructure.

In various embodiments, network slices such as per-service network slices are created as follows. An operator-controlled SCME creates network slices customized for each service. The network slices are configured according to parameters selected and specified by the SCME. For example, the created network slices may follow a specified format such as slice format "A", "B", "C" or "D" as described above. The network slices may be created off-line before a request for the slice, or on-line in response to a request for the slice. The network slices may be end-to-end or edge-to-edge slices. Off-line creation may be implemented for services which are well known, generalized, and/or frequently requested. An off-line slice such as a per-service-type slice may be shared among customers.

Figure 8:
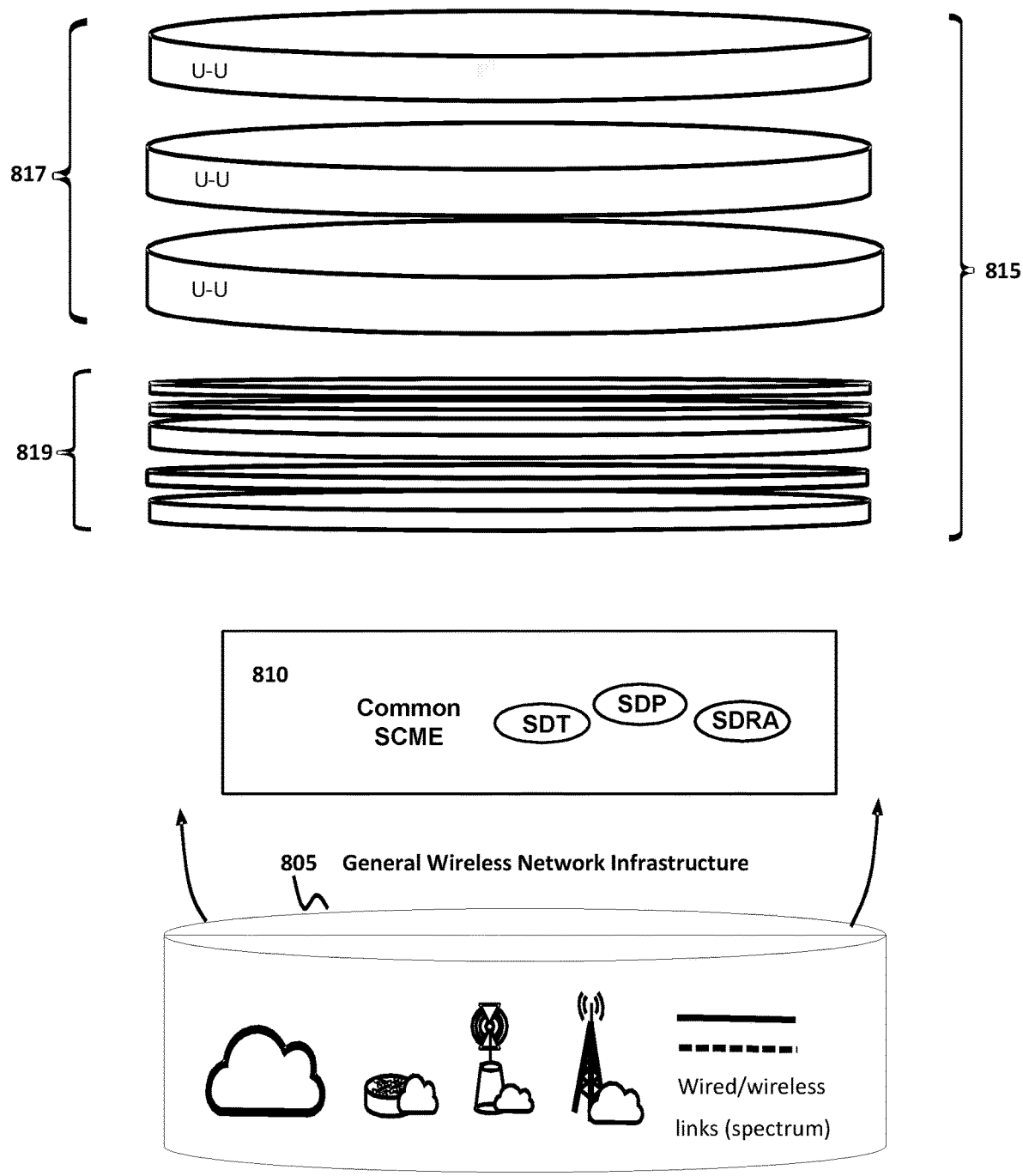
FIG. 8 illustrates a common SCME component operating over a general wireless network infrastructure and used to create and configure network slices, in accordance with an embodiment of the present invention.

FIG. 8 illustrates a common SCME 810 instantiated using the resources of a general wireless network infrastructure 805. The SCME 810 is configured to initiate the creation of network slices 815, and to manage the network slice configuration. The network slices 815 may include user-to-user slices 817, such as slices dedicated to particular customers and/or slices corresponding to operator-defined services. The network slices 815 may include slices having dedicated resources for operating a virtual network. The network slices 815 may include machine-to-machine slices 819 such as meter reading service slices, for example customized to MTC services or service types. The common SCME 810 is provided using network resources lying outside of the network slices 815. The resources of the common SCME are communicatively coupled to resources inside the network slices.

In some embodiments, a network slice and/or segments of the network slice may be fully configured upon generation or creation. Network slice configuration may include selecting and retrieving a pre-defined network slice template, and creating the network slice according to the template. The template is selected based on operating requirements of the network slice. For example, a network slice created to support M2M traffic may be configured based on an M2M-specific template. A plurality of selectable templates may be provided.

In some embodiments, a network slice and/or segments thereof may be adapted or re-configured after creation. A network slice may be created rapidly on-demand, for example based on a template, and then tuned for a specific use. In some embodiments, the network slice is adapted or re-configured based on parameters provided by a customer or user. In some embodiments, the network slice is adapted or re-configured based on observed characteristics of data traffic supported by the network slice.

In some embodiments, an existing network slice and/or segments thereof may be adapted based on a set of customer requirements received after slice instantiation. Adaptation may be performed to address altered or additional customer requirements. Adaptation may include adding capabilities and/or capacity to the network slice.

In some embodiments, adapting a network slice includes changing the slice from an edge-to-edge slice to an end-to-end slice or vice-versa. In some embodiments, adapting a network slice comprises changing the slice format, changing the purpose of the slice, changing the number and type of customers served by the slice and/or changing the granularity of the slice.

In some embodiments, for example for a per-service-type network slice, an infrastructure management (InfM) function element is provided within a network slice. The InfM is configured to receive infrastructure resource requirements from an entity such as an internal (intra-slice) SCME of the network slice. The InfM is configured to obtain network resource usage logs or analytics from a data analytics management function element. The data analytics management function element is configured to monitor network resource usage in association with operation of entities, such as nodes or functions, of the network slice. The InfM is configured, based on the resource requirements and network resource usage logs/analytics, to adjust the operating characteristics of the network slice, such as the resources assigned to the slice. In some embodiments, a common SCME is configured to perform per-slice infrastructure management. For example, each slice may be adapted by the common SCME based on observed resource usage.

In some embodiments, for example in relation to a per-service slice, a customer or a device or application thereof may be involved in the resource usage monitoring. For example, the customer device may provide feedback in the form of performance metrics indicating their observed QoE. A customer service management element may be configured to trigger adaption or re-configuration of the network slice based on the feedback. The adaptation may include increasing resource allocations to improve QoE, or reducing resource allocation when QoE is satisfactory and more resources than necessary are allocated to the network slice.

In some embodiments, adapting and/or reconfiguring a network slice may be performed in response to an event. For example, an in-network application process, or an event reflective of end device mobility, may trigger a slice adaptation operation.

Figure 9:
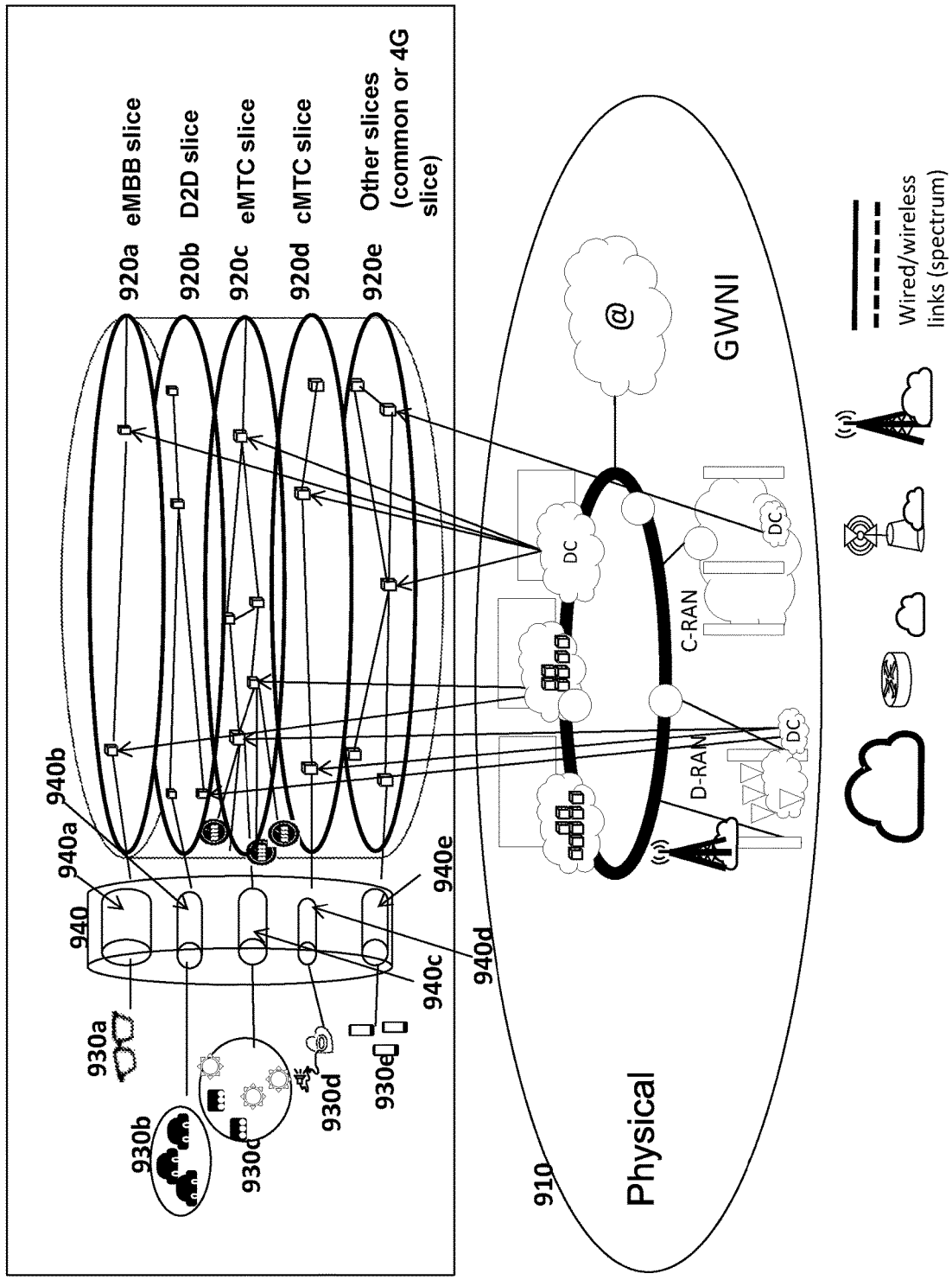
FIG. 9 illustrates a network configuration in accordance with an embodiment of the present invention.

FIG. 9 illustrates a network configured in accordance with an embodiment of the present invention. A physical network 910 is illustrated, including radio access networks, datacenters (DC), backhaul links, and the like. Plural network slices 920a to 920e are instantiated, using resources in the physical network 910, for example via network function virtualization. The illustrated network slices include an evolved Mobile Broadband (eMBB) slice 920a, a device-to-device (D2D) slice 920b, an evolved Machine-type Communication (eMTC) slice 920c, a cellular Machine-type Communication (cMTC) slice 920d, and other slices 920e such as network slices operating as a 3G and/or 4G wireless communication. Resources may be allocated to the network slices using soft slicing. Each network slice 920a to 920e supports a corresponding set of end devices 930a to 930e via an edge network segment 940. Each slice may have its own edge network segment. Resources used in a slice may be distributed throughout the network and/or geographically.

In relation to the above, hard slicing refers to the reservation of physical resources for a slice, where the reserved resources cannot be used by another slice even if they are unutilized or under-utilized. Soft slicing refers to an approach in which specific resources are not reserved, but rather resource allocation upper bounds are specified. In soft slicing, a set of shared network access resources may be scheduled and shared dynamically by multiple slices.

In some embodiments, as illustrated in FIG. 9, multiple edge network schedulers 940a to 940e are provided, each dedicated to providing access to a corresponding one of the network slices 920a to 920e, located within radio access network resources 940. Each edge network scheduler may correspond to a separate edge network segment. The multiple edge network schedulers 940a to 940e are provided using hard slicing of edge network resources. The edge network schedulers may operate independently of each other to schedule access to network slices by end devices 930a to 930e. Each edge network scheduler may be assigned a subset of resources, such as time and/or frequency resources for accessing a shared medium. The resources allocated to each edge network scheduler may be determined by another entity such as the common SCME.

According to an embodiment of the present invention, network slicing may proceed as follows. First, a common SCME creates offline slices having slice format "C." An SDT management function of the common SCME determines a logical topology for each shared network slice. A shared network slice may refer to a network slice which is shared between users or applications, for example. A shared slice may be created for a class of users, applications, or services that have some common properties. A cap on the amount of network resources used for a slice may also be specified. The SDT management function of the common SCME creates or updates a database containing a description of the logical topology of the network slices.

Continuing with the above embodiment, a software-defined resource allocation traffic engineering (SDRA-TE) management function of the common SCME determines an allocation of physical link resources for each network slice. A cap on the amount of physical resources for a slice may also be specified. The SDRA-TE management function further creates or updates a database containing a description of the determined physical link resources, such as bandwidth, for the network slices.

Continuing with the above embodiment, a software-defined resource allocation access link (SDRA-AL) management function of the common SCME determines an allocation of access link resources for each network slice. Connecting a UE to a slice can be viewed as a type of service, with corresponding resource requirements. A cap on the amount of access link resources used for a slice may also be specified. The SDRA-AL management function further creates or updates a database containing a description of determined access link frame structures for the network slices. Additionally or alternatively, an access link network node frame structure can be directly configured.

In various embodiments, a database describing aspects of the network slices is provided and maintained. In some embodiments, the database may be referred to as a "slice virtual GWNI'—slice v-GWNI database". The database describes the network slice "virtual" infrastructure topologies. GWNI refers to "General Wireless Network Infrastructure," and is the physical infrastructure which a network operator interacts with. V-GWNI refers to "Virtual GM/NI," and is a virtual infrastructure that is navigated by a customer or their equipment, when interacting with the customer's network slice.

In some embodiments, an internal SCME component of a shared network slice may be invoked to further differentiate sub-services within the shared network slice. If the shared network slice includes an SDT management function of the internal SCME, a virtual slice infrastructure allocated by the common SCME may be used to define per-service logical topologies. This may include configuring the logical topology used by each service sharing the shared network slice in a particular way. The infrastructure may then be informed of the configured logical topology. A SDRA-AL management function of the internal SCME may allocate resources to particular ones services of the shared services using access link resources described in the 'v-GWNI' database. A SDRA-TE management module of the shared network slice may be invoked to map logical links into per-slice v-GWNI. Further, network nodes involved in the v-GWNI may be configured. Having regard to SDRA, in some embodiments, a tunnel-scheduler may be invoked and configured to facilitate appropriate packet prioritization. If the shared network slice includes a SDP management module, an end-to-end or segment transport protocol can be determined, and involved network nodes may be configured in the v-GWNI. Where a management module above is not included, a default configuration may be used.

Figure 10:
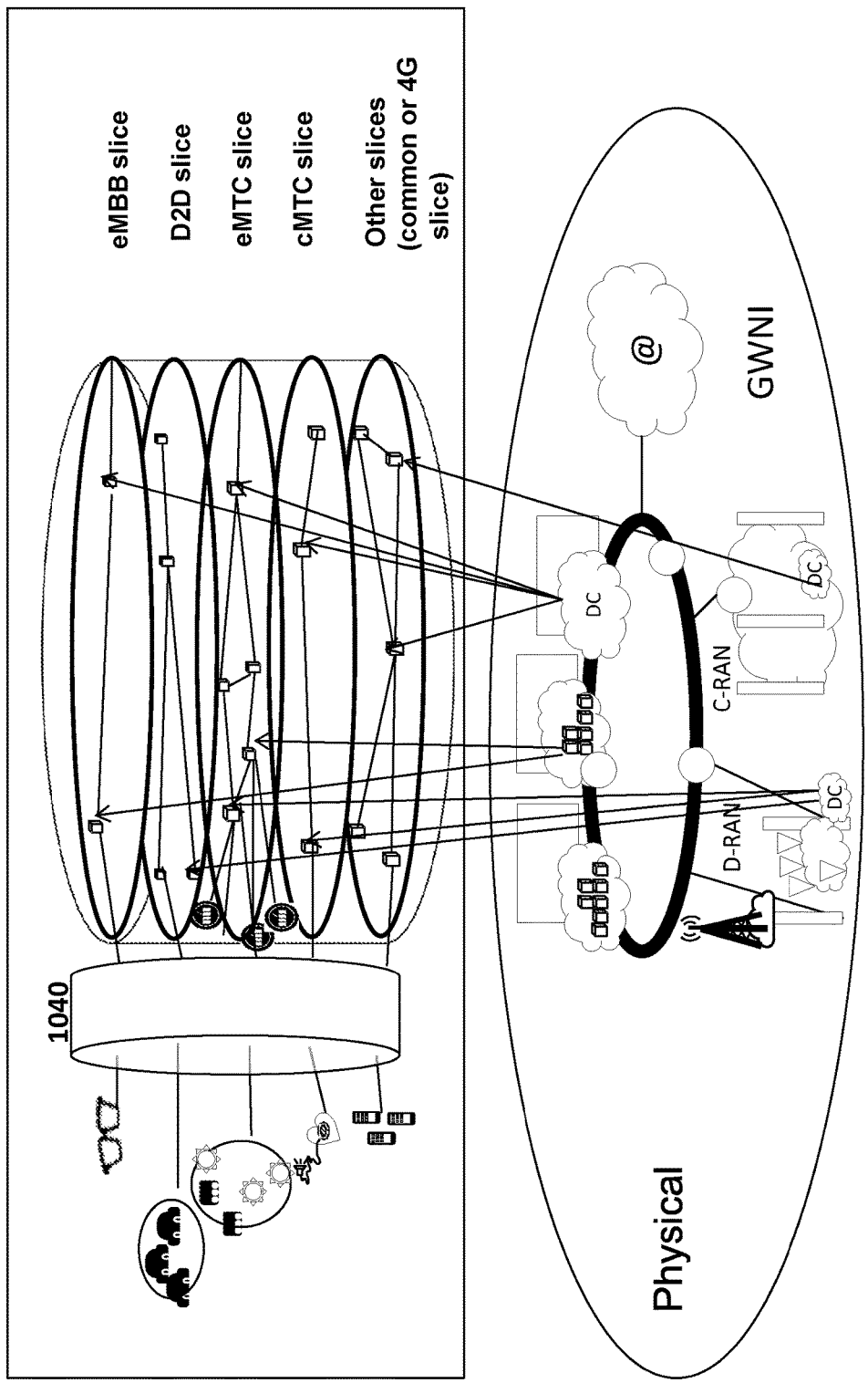
FIG. 10 illustrates a network configuration in accordance with another embodiment of the present invention.

FIG. 10 illustrates a network configuration in accordance with another embodiment of the present invention. This network configuration is similar to that of FIG. 9, except that, rather than using multiple edge network schedulers for different network slices; a single edge network segment 1040 is provided which is shared among network slices and includes a single, common edge network scheduler. The common edge network scheduler may allocate edge network resources using soft slicing.

In some embodiments, a combination of the configurations of FIG. 9 and FIG. 10 may be provided. Two or more edge network schedulers may be provided, at least one of the two or more edge network schedulers being used shared between two or more network slices.

According to an embodiment of the present invention, network slicing may proceed as follows. A common SCME creates offline network slices having slice format "A." A SDT management function determines a logical topology for each shared network slice. A cap on the amount of cloud resources used for a slice may also be specified. The SDT management function further creates or updates a database containing a description of the determined logical topology of the network slices. The database may further reflect the cloud resource cap for NFV-enabled network nodes and datacenter (DC) elements. The database may further reflect a logical link rate cap, if specified.

In some embodiments, a SDRA-AL management function also determines a schedule of device traffic across slices. In some embodiments, a SDRA-TE management function also determines a routing and/or path allocation for links. This may involve configuration of network nodes within the v-GWNI. The SDT management function, SDRA-AL management function, and SDRA-TE management function may be functions of the common SCME.

In some embodiments, on-line and off-line per-service slice creation (such as slice creation and adaptation) within a format "A" slice may be performed. An internal (intra-slice) SCME management function may perform or cause the following operations to be performed. For SDT, the per-service logical topology may be determined based on the v-GWNI, and involved network nodes within v-GWNI of the shared slice may be configured, if required. For SDP, a particular protocol or set of protocols may be determined. Further, the v-GWNI may be configured. For SDRA-AL packet prioritization within slices may be configured, if required. For SDRA, logical tunnel scheduling and packet prioritization may be configured.

In various embodiments of the present invention, off-line shared-slice creation, having slice format "B", may proceed as follows. The common SCME management function may proceed similarly to the case of slice format "A" creation as described above, except that a common SDP management function is invoked to determine the appropriate slice edge protocol to be used. The core part protocol may be set to a default protocol, such as an IP protocol. An internal (intra-slice) SCME management function may also participate in the slice definition or modification following slice creation. For example, an internal SDP management function (of the internal SCME) can be configured to select, for use, a sub-set of function elements defined by the common SCME's SDP management function.

The off-line shared-slice creation can refer to pre-definition of a network slice for a commonly used class of services, such as an M2M service. During slice creation, there may not necessarily be a customer. Rather, customers are connected to the pre-defined slice as they arrive. This pre-definition can potentially decrease latency and simplify network management.

In some embodiments, the internal SCME operates as the common SCME to offer services to sub-slices and/or sub-services. For example, the common SCME may create a M2M slice for an M2M service provider. The M2M service provider may then run its own SCME over the provided virtual network, treating the virtual resources as physical resources, to create slices, such as sub-slices of the M2M slice, for hosting sub-services such as smart grid service, fleet management service, industry control service, or the like. Thus, slices may be nested within slices, and the internal SCME of one slice may be treated as the common SCME for the slices nested therein. In some embodiments, the common SCME-SDP defines a broad range of protocol function elements for the M2M service provider. The M2M service provider selects some of the protocol function elements to use for its sub-services. In some embodiments, the nested slices may be managed as separate slices. In some embodiments, a nested slice may have a slice format which is at least as specific as the slice format of the slice within which it is nested. For example, a slice which is nested within a host slice of format "B" may have format "B", "C" or "D".

A flat/distributed slice format in accordance with an embodiment of the present invention is described as follows. A network address or global device identifier is assigned to all network nodes of the slice. The network address may include an IP address, for example. Pre-defined QoE provisioning, service-specific function processing, and service-specific function placement is performed.

Continuing with the above embodiment, customers provide information such as specialized service function requirements, QoE requirements, and transport protocol stack customization. The customer indicates these requirements to the network, for example using a UE or other device, along with a service ID or slice ID to be associated with the requirements. The network nodes locally determine how packets are to be forwarded based on slicing instructions. In order for traffic associated with a UE to receive the desired treatment, the service ID or slice ID may be included by the UE in its transmissions. Additionally, the UE may indicate QoE and protocol stack requirements. The network then handles the UE traffic with respect to the indicated requirements. The SCME may provide additional treatment to service traffic, for example by routing the traffic through a traffic aggregation point to reduce packet header overhead. These additional treatments may be added by the network in order to improve network operations.

In one embodiment, a network slice may be configured according to a hybrid slice format. The hybrid slice format may be a distributed format but with certain centralized instructions. For example, centralized SDT and SDP definitions may be used with local definitions for SDRA and/or routing decisions. The centrally-made SDT and SDP definitions are applied as guidelines for each slice, and intra-slice SDRA components make local decisions with respect to the guidelines.

Embodiments of the present invention provide for cloud resource management in datacenter (DC) and VNF-enabled network nodes. In some embodiments, cloud resources in certain network nodes may be controlled by both a common SCME and an associated internal (intra-slice) SCME. For example, one or both of DC-enabled nodes and NFV-enabled network nodes may be controlled in this way. Appropriate cloud resources may include CPU, storage, and network ports.

In some embodiments, an operator-controlled SDT management function of the common SCME manages cloud resources during network slice instantiation and/or adaptation. The SDT management function may allocate virtual resources for use by a network slice and/or define a cap for usage of one or more types of virtual resources by the network slice. In some embodiments, the internal (intra-slice) SCME management function associated with a network slice may be configured to manage the virtual resources via VIM in the same way.

In some embodiments, an operator-controlled SDT management function of the common SCME manages cloud resources during network slice instantiation and/or adaptation by one or both of explicitly reserving physical resources for the slice, and on-boarding and instantiating the required functions. For physical resource reservation, an internal (intra-slice) SCME management function can be configured to manage the physical resources via a Virtualized Infrastructure Manager (VIM). For on-boarding, the internal SCME management function can be configured to determine which of the functions to use and how to use in services.

In some embodiments, a VIM instantiated using resources in a DC cloud and/or other in-network sets of cloud resources is configured using a combination of a common SCME management function and multiple internal (intra-slice) SCME management functions. In one embodiment, the VIM is configured to perform dynamic resource scheduling for on-demand resource allocation. The VIM may be an enhanced VIM which includes a VIM resource scheduler. On-demand resource allocation may be performed upon receiving requests from an internal (intra-slice) SCME or virtual function state change. On-demand resource allocation may be configured to respect the caps computed by the common SCME. On-demand resource allocation may allow resource multiplexing.

In some embodiments, network nodes may be configured by multiple SCME management functions for bandwidth considerations, particularly with respect to slice formats "C" and "D."

Figure 11:
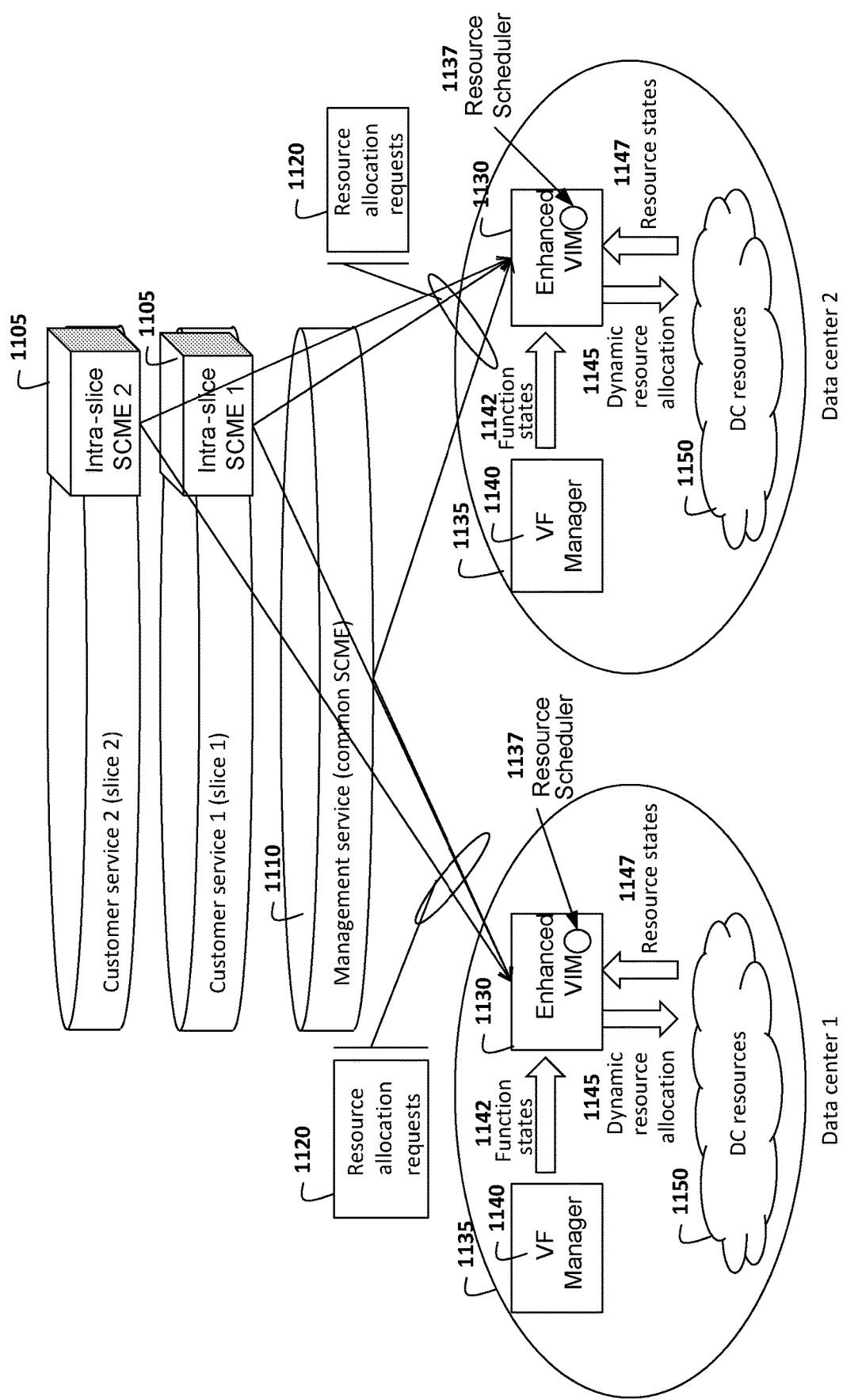
FIG. 11 illustrates an example architecture related to cloud resource management in datacenter and VNF-enabled network nodes, in accordance with an embodiment of the present invention.

FIG. 11 illustrates an example architecture related to cloud resource management in datacenter and VNF-enabled network nodes, in accordance with an embodiment of the present invention. Internal SCMEs 1105 residing in customer service slices and a common SCME residing in a management service slice 1110 transmit resource allocation requests 1120 to VIMs 1130 located in data centers 1135. The VIMs 1130 include resource schedulers 1137 operating as described above. The VIMs 1130 receive messages 1142 indicative of existing functions states from VF managers 1140 in the same data centers as the VIMs. The VIMs further transmit dynamic resource allocation messages 1145 to collections of datacenter resources 1150 in the same data centers as the VIMs. The VIMs further receive messages 1147 indicative of states of the datacenter resources. The VIMs can therefore respond to the resource allocation requests by allocating the datacenter resources.

It will be readily understood that, throughout the preceding discussion, the above-described network functionalities and operations may correspond to a method for use in supporting operation of a communication network, such as a $5^{th}$ generation wireless communication network. The method may involve computer-implemented functions, namely functions which are implemented by one or more computing, communication and/or storage devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or storage devices of the network infrastructure. General-purpose variants of such devices may be configured to provide the required functionality through virtualization technologies. For example, one or more given generic computer hardware platforms may be used to provide one or more virtual computing machines, which are configured as described herein.

Devices may include other hardware such as Application Specific Integrated Circuits, microcontrollers, and digital logic circuits. Real or virtual devices may be located within a communication network control plane, within a data plane, or a combination thereof. Computing devices used to implement method operations may include a processor operatively coupled to memory, the memory providing instructions for execution by the processor to perform the method as described herein.

Figure 12:
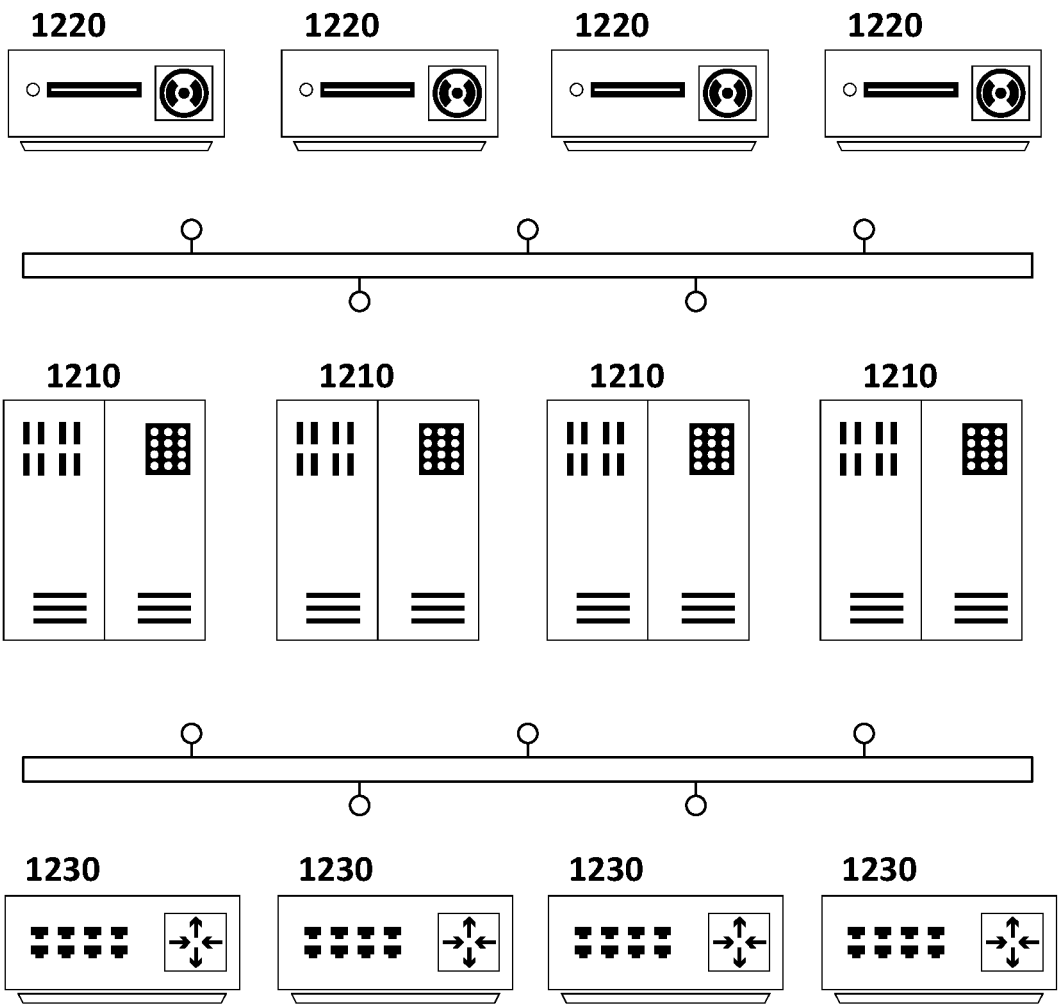
FIG. 12 illustrates an apparatus provided in accordance with embodiments of the present invention.

Some embodiments of the present invention are implemented using computing devices such as servers or collections of servers, capable of high-speed communication with other devices in the network infrastructure. Such computing devices may correspond to infrastructure devices of the communication network. Computing devices may be dedicated to a particular function, or provide a platform for supporting virtualized functions. FIG. 12 illustrates a collection of standard servers 1210, data storage units 1220, and network communication components 1230 such as network interfaces and/or switches, which are provided in accordance with embodiments of the present invention. The components may be co-located, geographically distributed, or a combination thereof. The microprocessors of the computing devices, operatively coupled to memory such as server memory and/or data storage unit memory, and the network communication components may be configured to instantiate and execute the various functions, modules, interactions therebetween, and the like, as described herein. Functions may be instantiated at an appropriate network and/or geographic location, and may be moved as required. An apparatus according to embodiments of the present invention may comprise the microprocessors, memory and network communication components configured to perform one or more functions as described herein.

Figure 13:
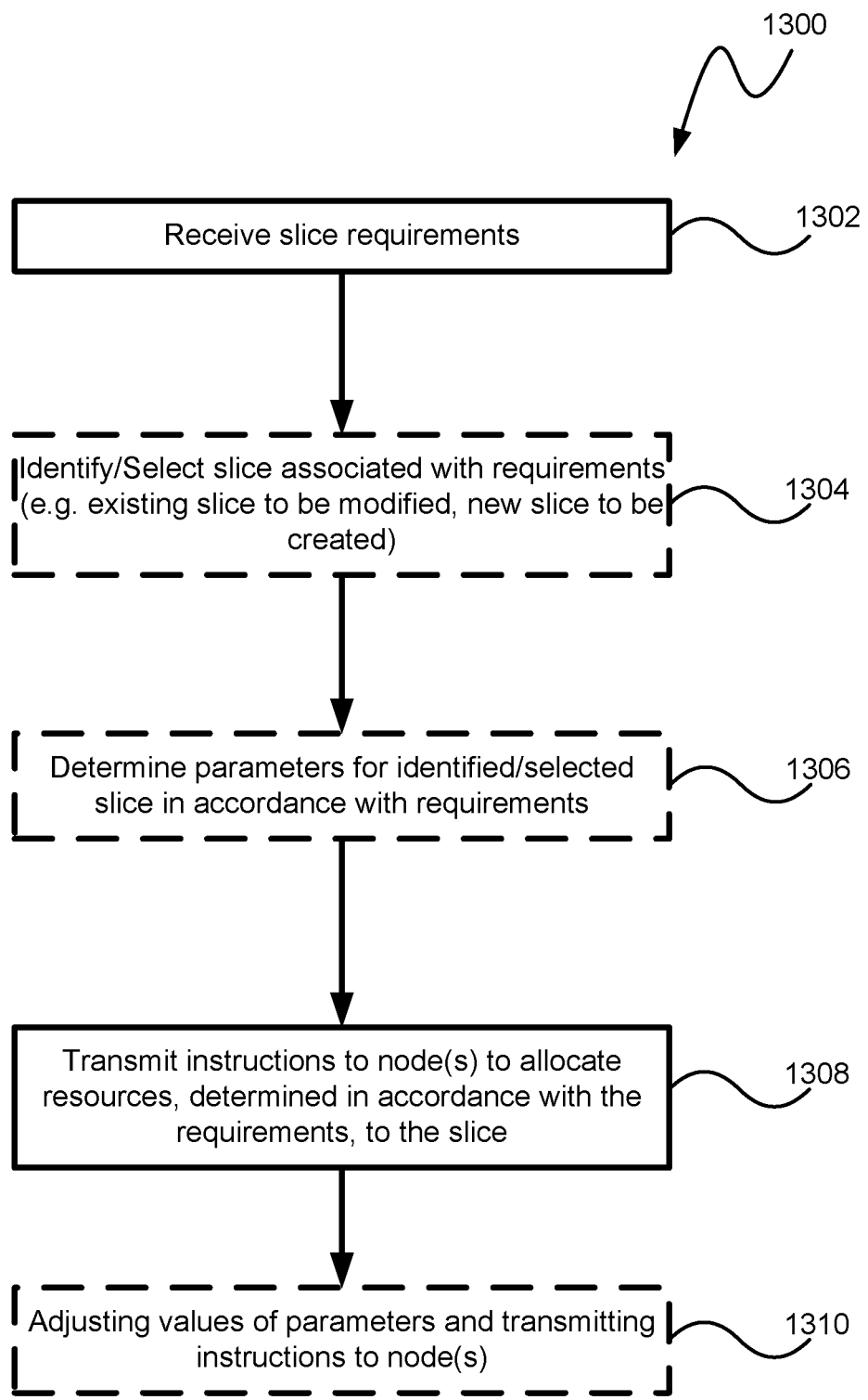
FIG. 13 is a flow chart illustrating a method in accordance with embodiments of the present invention.

FIG. 13 is a flow chart illustrating a method 1300 that can be carried out by an SCME as described above. In step 1302 the SCME receives requirements, typically from a customer. The requirements are used to determine whether a slice is to be created, or modified, and can also be used to determine which nodes in the network that underlie the slice will be required to act. In step 1308 the SCME transmits instructions to at least one node to allocate resources to the slice. The allocation of resources can be determined in accordance with the received requirements. In optional steps 1304 and 1306, the slice (existing or to be created) associated with the requirements is selected, and the parameters associated with the slice are defined. Subsequent to the creation of a slice, if the parameters of a slice are to be modified, the adjusting of parameters and transmitting of instructions to nodes can be carried out in step 1310 if required.

In some embodiments structural components of the invention can be configured with sufficient functionality to enable instantiation of their respective functionality on an as-needed basis according to current processing requirements. These may, for example, be realized as virtual network functions (VNFs) within a Network Function Virtualization (NFV) framework. For example, a VNF corresponds to a function enabling operation of a communication network. For example a VNF can provide the functions of a router, switch, gateway, firewall, load balancer, server, mobility management entity, and the like. The function is virtualized in the sense that it may utilize a set of virtual resources, such as computing, storage and networking resources, rather than utilizing dedicated hardware resources. As such, VNF may be instantiated on an as-needed basis using available virtual resources. NFV and virtual network functions architecture is described in ETSI GS NFV-SWA 001, for example.

In some embodiments the structural components of the invention may comprise software defined networking (SDN) components, or programs deployed on the same or differing device platforms of the communication network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via software defined topology (SDT). The SDT can be combined with the SDN and software defined protocol (SDP) to create a customized virtual network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for providing a network slice in a communication network, the network slice configured for use by one or more customers, the method comprising:
   receiving, at a slice creation and management entity (SOME), an indication of a set of requirements to be satisfied by the communication network for the one or more customers; and
   transmitting, by the SOME, instructions to a node in the communication network to allocate resources to a network slice having attributes determined in accordance with the set of requirements,
   wherein the network slice is defined according to a network slice format selected from a set of predetermined network slice formats, wherein each of the predetermined network slice formats specifies parameters for a predetermined set of said attributes, and wherein each of the plurality of network slice formats includes a different respective combination of unspecified parameters and specified parameters, the unspecified parameters and the specified parameters selected from a set of potential parameters, the method further comprising selecting and assigning values to the specified parameters.

2. The method according to claim 1, wherein the network slice is a pre-existing network slice, and wherein providing the network slice comprises adapting the pre-existing network slice.

3. The method according to claim 1, wherein providing the network slice comprises nesting the network slice within a pre-existing network slice.

4. The method of claim 1, wherein the specified parameters for one of the predetermined network slice formats is strictly contained within specified parameters for another of the predetermined network slice formats.

5. The method of claim 1, wherein one of the predetermined network slice formats specifies parameters for one or more function elements characterized as service-specific function elements, required function elements, or a combination thereof.

6. The method of claim 5, wherein said one of the predetermined network slice formats has at least one unspecified parameter.

7. The method of claim 5, wherein said one of the predetermined network slice formats specifies parameters for two or more of the function elements and further specifies an ordering between the two or more of the function elements for data processing.

8. The method of claim 7, wherein said one of the predetermined network slice formats further specifies parameters for placement of the one or more function elements within infrastructure of the communication network.

9. The method of claim 8, wherein said one of the predetermined network slice formats further specifies parameters for one or more protocols to be used by the network slice.

10. The method of claim 8, wherein said one of the predetermined network slice formats further specifies parameters for physical bandwidth allocations for use within the network slice, and a virtual network logical topology for the network slice.

11. The method of claim 10, wherein said one of the predetermined network slice formats further specifies parameters for one or more protocols to be used by the network slice.

12. The method of claim 1, wherein the set of potential parameters includes: a virtual network graph structure; service-specific function elements to be instantiated; placement of service-specific function elements to be instantiated; forwarding rules of network nodes involved in the network slice; a service-specific data plane protocol to be used in the network slice; a customized protocol stack to be used in the network slice; physical bandwidth allocation for use within the slice; and a virtual network physical topology to be used by the network slice.

13. The method of claim 1, further comprising assigning values to the unspecified parameters subsequently to selection of the network slice format and prior to instantiation of the network slice.

14. The method of claim 1, further comprising adjusting values of the unspecified parameters subsequently to instantiation of the network slice.

15. The method of claim 1, wherein different ones of the predetermined network slice formats specify different detail levels for defining the network slice at time of creation.

16. A slice creation and management entity (SOME) apparatus for providing a network slice in a communication network, the network slice configured for use by one or more customers, the apparatus comprising:
 a processor operatively coupled to a memory; and
 a network communication interface configured to:
  receive an indication of a set of requirements to be satisfied by the communication network for the one or more customers; and
  transmit instructions to a node in the communication network to allocate resources to a network slice having attributes determined in accordance with the set of requirements,
 wherein the network slice is defined according to a respective network slice format selected from a set of predetermined network slice formats, wherein each of the predetermined network slice formats specifies parameters for a predetermined set of said attributes, and wherein each of the plurality of network slice formats includes a different respective combination of unspecified parameters and specified parameters, the unspecified parameters and the specified parameters selected from a set of potential parameters, the method further comprising selecting and assigning values to the specified parameters.

17. The apparatus according to claim 16, wherein the network slice is a pre-existing network slice, and wherein providing the network slice comprises adapting the pre-existing network slice.

18. The apparatus according to claim 16, wherein providing the network slice comprises nesting the network slice within a pre-existing network slice.

19. The apparatus of claim 16, wherein the predetermined set of attributes specified by one of the predetermined network slice formats is different from the predetermined set of attributes specified by another of the predetermined network slice formats.

20. The apparatus of claim 16, wherein one of the predetermined network slice formats specifies parameters for one or more function elements characterized as service-specific function elements, required function elements, or a combination thereof.

21. The apparatus of claim 20, wherein said one of the predetermined network slice formats has at least one unspecified parameter.

22. The apparatus of claim 20, wherein said one of the predetermined network slice formats specifies parameters for two or more of the function elements and further specifies an ordering between the two or more of the function elements for data processing.

23. The apparatus of claim 22, wherein said one of the predetermined network slice formats further specifies parameters for placement of the one or more function elements within infrastructure of the communication network.

24. The apparatus of claim 23, wherein said one of the predetermined network slice formats further specifies parameters for one or more protocols to be used by the network slice.

25. The apparatus of claim 23, wherein said one of the predetermined network slice formats further specifies parameters for physical bandwidth allocations for use within the network slice, and a virtual network logical topology for the network slice.

26. The apparatus of claim 25, wherein said one of the predetermined network slice formats further specifies parameters for one or more protocols to be used by the network slice.

27. The apparatus of claim 16, wherein the set of potential parameters includes: a virtual network graph structure; service-specific function elements to be instantiated; placement of service-specific function elements to be instantiated; forwarding rules of network nodes involved in the network slice; a service-specific data plane protocol to be used in the network slice; a customized protocol stack to be used in the network slice; physical bandwidth allocation for use within the slice; and a virtual network physical topology to be used by the network slice.

28. The apparatus of claim 16, further configured to assign values to the unspecified parameters subsequently to selection of the network slice format and prior to instantiation of the network slice.

29. The apparatus of claim 16, further configured to adjust values of the unspecified parameters subsequently to instantiation of the network slice.

30. The apparatus of claim 16, wherein different ones of the predetermined network slice formats specify different detail levels for defining the network slice at time of creation.

31. A system comprising: the apparatus of claim 16; and
an internal SOME provided within the network slice, the internal SOME operatively coupled to the SOME, the internal SOME having a processor operatively coupled to a memory and a network communication interface, the internal SOME configured to configured to allocate resources for supporting one or more services or applications of the network slice.

32. The apparatus of claim 31, wherein the internal SOME is configured to allocate resources of the network slice to a plurality of network sub-slices.

* * * * *